US008250664B2

(12) United States Patent
Yamaguchi et al.

(10) Patent No.: US 8,250,664 B2
(45) Date of Patent: Aug. 21, 2012

(54) COPYRIGHT PROTECTION DATA PROCESSING SYSTEM AND REPRODUCTION DEVICE

(75) Inventors: Takahiro Yamaguchi, Hyogo (JP); Masaya Yamamoto, Osaka (JP); Sanzo Ugawa, Osaka (JP); Toshihisa Nakano, Osaka (JP); Kaoru Murase, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/524,604

(22) PCT Filed: Feb. 22, 2008

(86) PCT No.: PCT/JP2008/000311
§ 371 (c)(1),
(2), (4) Date: Jul. 27, 2009

(87) PCT Pub. No.: WO2008/102565
PCT Pub. Date: Aug. 28, 2008

(65) Prior Publication Data
US 2010/0100969 A1    Apr. 22, 2010

(30) Foreign Application Priority Data

Feb. 23, 2007 (JP) .................................. 2007-043411
Nov. 20, 2007 (JP) .................................. 2007-300819

(51) Int. Cl.
*H04L 29/06* (2006.01)
(52) U.S. Cl. .......................................... 726/27; 713/193
(58) Field of Classification Search .................. 713/193; 365/94, 189.011; 705/908, 911; 726/26, 726/27
See application file for complete search history.

(56) References Cited

U.S. PATENT DOCUMENTS

| 5,805,699 | A   |   | 9/1998  | Akiyama et al.              |
|-----------|-----|---|---------|-----------------------------|
| 6,028,936 | A   | * | 2/2000  | Hillis ................ 713/168 |
| 6,772,133 | B1  | * | 8/2004  | Kambayashi et al. ...... 705/57 |
| 6,941,283 | B2  | * | 9/2005  | Kambayashi et al. ...... 705/57 |
| 7,058,284 | B2  |   | 6/2006  | Zou et al.                  |
| 7,096,268 | B1  |   | 8/2006  | Shoda et al.                |
| 7,127,431 | B2  | * | 10/2006 | Kambayashi et al. ...... 705/57 |
| 7,240,207 | B2  | * | 7/2007  | Weare .................. 713/176 |

(Continued)

FOREIGN PATENT DOCUMENTS

EP        0 679 979        11/1995

(Continued)

OTHER PUBLICATIONS

International Search Report issued May 27, 2008 in the International (PCT) Application of which the present application is the U.S. National Stage.

(Continued)

*Primary Examiner* — David García Cervetti
(74) *Attorney, Agent, or Firm* — Wenderoth Lind & Ponack, L.L.P.

(57) ABSTRACT

A content protection data processing system and a playback device determine whether to permit playback of a content recorded in a recording medium, based on a type of the recording medium and a signature type of a signature attached to a program. Additionally, the content protection data processing system and the playback device switch a procedure relating to a digital signature for each signature type of the digital signature, which enables both the protection of the copyright of the content and the efficient manufacturing of commercial ROM media.

11 Claims, 19 Drawing Sheets

U.S. PATENT DOCUMENTS

| | | | |
|---|---|---|---|
| 7,281,274 B2 * | 10/2007 | Manning et al. | 726/31 |
| 7,389,272 B2 * | 6/2008 | Kambayashi et al. | 705/59 |
| 7,451,490 B2 * | 11/2008 | Pirich et al. | 726/26 |
| 7,533,262 B2 * | 5/2009 | Clowes | 713/165 |
| 7,761,465 B1 * | 7/2010 | Nonaka et al. | 707/770 |
| 8,145,030 B2 * | 3/2012 | Isozaki et al. | 386/213 |
| 2002/0152387 A1 * | 10/2002 | Asano | 713/176 |
| 2003/0050894 A1 * | 3/2003 | Kambayashi et al. | 705/57 |
| 2003/0191954 A1 * | 10/2003 | Kambayashi et al. | 713/189 |
| 2004/0030656 A1 * | 2/2004 | Kambayashi et al. | 705/59 |
| 2004/0133519 A1 * | 7/2004 | Nakayama et al. | 705/50 |
| 2004/0243814 A1 * | 12/2004 | Nakano et al. | 713/189 |
| 2007/0065101 A1 * | 3/2007 | Takashima | 386/94 |
| 2007/0074032 A1 * | 3/2007 | Adams et al. | 713/176 |
| 2010/0054698 A1 * | 3/2010 | Isozaki et al. | 386/94 |
| 2010/0058487 A1 * | 3/2010 | Nakano et al. | 726/30 |

FOREIGN PATENT DOCUMENTS

| | | |
|---|---|---|
| EP | 1 764 697 | 3/2007 |
| JP | 10-83297 | 3/1998 |
| JP | 2006-277389 | 10/2006 |
| RU | 2 251 146 | 8/2000 |
| WO | 02/082280 | 10/2002 |

OTHER PUBLICATIONS

Russian Notice of Allowance (and English translation thereof) issued Jan. 26, 2012 in Russian Application 2009135397, which is a foreign counterpart of the present application.

Russian Office Action (and English translation thereof) issued Mar. 22, 2012 in Russian Application 2009135400 which is a foreign counterpart of the present application.

* cited by examiner

COPYRIGHT PROTECTION DATA PROCESSING SYSTEM AND REPRODUCTION DEVICE

BACKGROUND OF THE INVENTION

1. Technical Field

The present invention relates to an art of protecting copyrights of digital contents such as movie and music.

2. Background Art

In recent years, with the increase in storage capacities of recording media and the spread of broadband networks, there has become widespread a system in which digital contents are distributed by being recorded in recording media or via a broadband network. Note that the digital contents are generated by digitizing copyrighted works such as movie and music, and are hereinafter referred to just as "contents". In such a system, copyrights of contents need to be protected, and playback and copying of the contents need to be restricted under the agreement with copyright holders of the contents. As a conventional art for protecting copyright works against unauthorized acts such as copying of the copyright works without permission of copyright holders thereof, there has been known a method using an encryption technique. Also, there has been known a method of recording a program in a recording medium in addition to a content, and implementing a virtual machine that is an execution environment of the program in a playback device for playing back the content recorded in the recording medium. This art is disclosed in the Patent Document 1. When the recording medium is inserted into the playback device, the playback device reads the program from the inserted recording medium, and executes the read program in an execution environment (virtual machine) included therein. The content recorded in the recording medium is protected based on the program. When the program is executed, the protection of the content is cancelled, thereby enabling playback of the content.

On the other hand, in the process of manufacturing commercial recording media (hereinafter, referred to as "ROM media") having contents recorded therein, it is important to check the quality of the contents. It takes time to manufacture commercial ROM media. After frequent checking of the quality, the commercial ROM media are released in the market. Such commercial ROM media are generally manufactured by transferring the recorded contents to recording media such as R media and frequently performing the quality check of the contents and re-creation of the contents. Here, playback devices are capable of playing back both contents recorded in ROM media and contents recorded in R media. Also, it is impossible to judge whether a recording medium is an R medium manufactured for testing (quality check) in the process of manufacturing ROM media or an R medium manufactured by copying a ROM medium in an unauthorized manner. Accordingly, copyrights of contents might be infringed.
Patent Document 1: U.S. Pat. No. 7,058,284

However, if playback devices are prohibited from playing back contents recorded in R media, there occurs a problem that it takes more time to manufacture commercial ROM media. Conversely, if playback devices are permitted to play back contents recorded in R media, there occurs a problem that copyrights might be infringed.

In view of these, the present invention aims to provide a copyright protection data processing system and a playback device capable of solving the above problems.

SUMMARY OF THE INVENTION

In order to solve the above problem, the present invention provides a content playback device for playing back a digital content, the content playback device comprising: an information acquisition unit operable to acquire a content playback program to be used for playing back the digital content on a recording medium in which the digital content, the content playback program, and a digital signature attached to the content playback program are recorded; a medium type judgment unit operable to judge whether a medium type of the recording medium is a read-only type or a recordable type; a signature verification unit operable to perform verification of the digital signature using different signature verification methods between the read-only type and the recordable type; and a playback permission determination unit operable to prohibit performing playback of the digital content made by execution of the content playback program if the verification is unsuccessful.

Also, the content playback program may include a header part and an instruction code part, the signature verification unit may perform, as preprocessing of the verification of the digital signature, hash operation on at least one portion of the header part and all portions of the instruction code part, and perform the verification using a value obtained as a result of the hash operation, regardless of whether the judged medium type is the read-only type or the recordable type.

Also, the signature verification unit may use all the portions of the header part.

Also, the header part may include an instruction code size field defining a size of the instruction code part, and the signature verification unit may overwrite the instruction code size field with a fixed value before performing the hash operation if the judged medium type is the recordable type.

Also, the signature verification unit may perform the hash operation on the at least one portion of the header part and all the portions of the instruction code part, perform bit-inversion on the value obtained as a result of the hash operation, and perform the verification of the digital signature using a value obtained as a result of the bit-inversion, if the judged medium type is the recordable type.

Also, the content playback device may further comprise an encryption judgment unit operable to judge whether the digital content is encrypted, wherein the playback permission determination unit may further prohibit performing playback of the digital content made by execution of the content playback program if the digital content is judged to be encrypted.

The present invention provides a content provider terminal device for recording a digital content, the content provider terminal device comprising: a no-signature program storage unit operable to store therein a content playback program to be used for playing back the digital content; a transmission unit operable to transmit the content playback program and signature type information indicating whether a signature type of a digital signature to be attached to the content playback program is a test release type or an official release type; a reception unit operable to receive the content playback program to which the digital signature having the signature type indicated by the signature type information is attached; and a recording unit operable to record, in a recording medium, the content playback program to which the digital signature is attached and the digital content.

The present invention provides a certification authority terminal device for attaching a digital signature to a content playback program to be used for playing back a digital content, the certification authority terminal device comprising: a reception unit operable to receive, from a content provider terminal device for providing the digital content, the content playback program and signature type information indicating whether a signature type of a digital signature to be attached to the content playback program is a test release type or an official release type; a signature generation attachment unit operable to generate a digital signature using a different signature generation method for each of the signature types, and attach the generated digital signature to the content playback program; and a transmission unit operable to transmit, to the content provider terminal device, the content playback program to which the digital signature is attached.

Also, the content playback program may include a header part and an instruction code part, if the signature type information indicates the official release type, the signature generation attachment unit may perform hash operation on at least one portion of the header part and all portions of the instruction code part, and generate the digital signature using a value obtained as a result of the hash operation, and if the signature type information indicates the test release type, the signature generation attachment unit may perform hash operation on the at least one portion of the header part and all the portions of the instruction code part, perform bit-inversion on a value obtained as a result of the hash operation, and generate the digital signature using a value obtained as a result of the bit-inversion.

Also, the signature generation attachment unit may use all the portions of the header part.

Also, the header part may include a size field defining a size of the instruction code part, and the signature generation attachment unit may overwrite the size field with a fixed value before performing the hash operation if the signature type information indicates the test release type.

The present invention provides a recording medium for recording therein a digital content and a content playback program that is a program for performing playback processing of the digital content, wherein if the content playback program has an official release type, a digital signature having the official release type is attached to the content playback program, and if the content playback program has a test release type, a digital signature having the test release type is attached to the content playback program.

The present invention provides a content playback method of playing back a digital content, the content playback method comprising: an information acquisition step of acquiring a content playback program to be used for playing back the digital content on a recording medium in which the digital content, the content playback program, and a digital signature attached to the content playback program are recorded; a medium type judgment step of judging whether a medium type of the recording medium is a read-only type or a recordable type; a signature verification step of performing verification of the digital signature using different signature verification methods between the read-only type and the recordable type; and a playback permission determination step of prohibiting playback of the digital content made by execution of the content playback program if the verification is unsuccessful.

The present invention provides a content supply method of recording a digital content, the content supply method comprising: a no-signature program storage step of storing a content playback program to be used for playing back the digital content; a transmission step of transmitting the content playback program and signature type information indicating whether a signature type of a digital signature to be attached to the content playback program is a test release type or an official release type; a reception step of receiving the content playback program to which the digital signature having the signature type indicated by the signature type information is attached; and a recording step of recording, in a recording medium, the content playback program to which the digital signature is attached and the digital content.

The present invention provides a program certification method for attaching a digital signature to a program, the program certification method comprising: a reception step of receiving, from a content provider terminal device for providing the digital content, the content playback program and signature type information indicating whether a signature type of a digital signature to be attached to the content playback program is a test release type or an official release type; a signature generation attachment step of generating a digital signature using a different signature generation method for each of the signature types, and attaching the generated digital signature to the content playback program; and a transmission step of transmitting, to the content provider terminal device, the content playback program to which the digital signature is attached.

The present invention provides a content playback control program, comprising: an information acquisition step of acquiring a content playback program to be used for playing back the digital content on a recording medium in which the digital content, the content playback program, and a digital signature attached to the content playback program are recorded; a medium type judgment step of judging whether a medium type of the recording medium is a read-only type or a recordable type; a signature verification step of performing verification of the digital signature using different signature verification methods between the read-only type and the recordable type; and a playback permission determination step of prohibiting performing playback of the digital content made by execution of the content playback program if the verification is unsuccessful.

The present invention provides an integrated circuit that relates to a content playback device for playing back a digital content, the integrated circuit comprising: an information acquisition unit operable to acquire a content playback program to be used for playing back the digital content on a recording medium in which the digital content, the content playback program, and a digital signature attached to the content playback program are recorded; a medium type judgment unit operable to judge whether a medium type of the recording medium is a read-only type or a recordable type; a signature verification unit operable to perform verification of the digital signature using different signature verification methods between the read-only type and the recordable type; and a playback permission determination unit operable to prohibit performing playback of the digital content made by execution of the content playback program if the verification is unsuccessful.

The present invention provides a copyright protection data processing system composed of a certification authority terminal device for attaching a digital signature to a content playback program to be used for playing back a digital content, a content provider terminal device for recording the digital content and the content playback program in a recording medium, and a content playback device for playing back the digital content, wherein the certification authority terminal device comprises: a first reception unit operable to receive the content playback program and signature type information from the content provider terminal device, the signature type information indicating whether a signature type of the digital signature to be attached to the content playback program is a test release type or an official release type; a signature type recording unit operable to add the received signature type information to the content playback program; a signature generation attachment unit operable to generate the digital signature using a different signature generation method for each of the signature types, and attach the generated digital signature to the content playback program to generate a signature program having the digital signature attached thereto; and a first transmission unit operable to transmit the generated signature program to the content provider terminal device, the content provider terminal device comprises: a no-signature program storage unit operable to store therein the content playback program; an acquisition unit operable to acquire the signature type information indicating the signature type of the digital signature to be attached to the content playback program; a second transmission unit operable to transmit the content playback program and the signature type information to the certification authority terminal device; a second reception unit operable to receive the signature program from the certification authority terminal device; and a recording unit operable to record the signature program and the digital content in the recording medium, and the content playback device comprises: an information acquisition unit operable to acquire the signature program on the recording medium; a medium type judgment unit operable to judge whether a medium type of the recording medium is a read-only type or a recordable type; a signature verification unit operable to perform verification of the digital signature using different signature verification methods between the read-only type and the recordable type; and a playback permission determination unit operable to prohibit performing playback of the digital content made by execution of the content playback program if the verification is unsuccessful.

In the content market where manufacturers of playback devices develop playback devices and content providers develop contents, the operation check of contents under development is performed using as many playback devices as possible to find defects in advance. The manufacturers of playback devices and the content providers correct the defects of playback devices and the defects of the contents respectively so as to perform the compatibility verification. Then, high-quality contents are released. This brings merits to the content providers. For example, it is possible to reduce the recall risk due to the playback impossibility caused by the defects of the contents. Also, it is possible to realize a highly-attractive user interface by performing tuning in accordance with the ability of playback devices even if the ability is low.

If cooperative manufacturers of playback devices provide content providers with special playback devices for normally executing even a program to which no signature is attached that is recorded in an R medium, the content providers can perform the compatibility verification to realize the correction cycle of assessing contents and correcting defects of the contents in a shortened period. However, it takes time to have negotiations with many manufacturers of playback devices in order to have them prepare such special playback devices. Also, if software of commercially available playback devices needs to be updated due to some defects, it is highly possible that software of the special playback devices managed by content providers has the same defects as that of the commercially available playback devices and needs to be updated. In such a case, it takes time to send back the special playback devices having the defects to the manufacturers of the special playback devices to have the software updated. Furthermore, there might occur a case in which some of the manufacturers of playback devices might refuse to update the software or refuse to provide with the special playback devices from the beginning.

In view of these, by defining a common specification for R media such that playback of a content is permitted in a case where a digital signature having a test release type is attached to a program corresponding to the content, content providers have a certification authority issue a digital signature having the test release type for the program. As a result, it is possible to perform the playback compatibility using the program to which the digital signature having the test release type is attached and an R medium in which the content is recorded. In this case, it is unnecessary to manufacture ROM media. This shortens a period for performing a series of correction cycles including assessment, correction, and reassessment of contents by a period necessary for manufacturing ROM media. It is true that it takes time and money to have a digital signature having the test release type issued. However, the digital signature having the test release type is issued without verifying data of the digital signature, unlike the issuance of a digital signature having an official release type. Accordingly, it takes less time and money to issue a digital signature having the test release type than a digital signature having the official release type. On the other hand, it is unnecessary to have all the manufacturers of playback devices prepare special playback devices. The content providers only have to purchase commercially available playback devices, and store a program to which a digital signature having the test release type is attached and a content in an R medium so as to perform the compatibility verification. This brings great merits to the content providers.

However, on the other hand, assume that if a specification is defined such that execution of a program to which a digital signature having the test release type is attached is permitted, some of manufacturers of playback devices might manufacture playback devices having poor implementations, and execute a program to which a digital signature having the test release type is attached without judging whether the digital signature has the test release type or the official release type. In such a case, there is a possibility that the playback devices manufactured by such manufacturers might execute a program to which a digital signature having the official release type is attached, as well as a program to which a digital signature having the test release type is attached. Assume that a content prepared by breaking a code and a program to which a digital signature having the official release type is attached is written from a commercially available ROM medium into an R medium and, a playback device having poor implementation plays back the content. In such a case, the program is executed, and as a result the content is normally played back. If manufacturers of playback devices perform implementation such that execution of a program to which a digital signature having the test release type is attached is supported, it is possible not to mistakenly execute a program to which a digital signature having the official release type is attached, by making playback devices have the structure in which signature type is certainly judged and poor implementation cannot be performed.

The present invention can reduce poor implementation made by manufacturers of playback devices to make, by partially modifying a procedure of signature generation and a procedure of signature verification depending on whether a signature has the test release type or the official release type.

According to the present invention with the above structures, it is possible to realize both the efficient manufacturing of commercial ROM media and the protection of copyrights of contents.

DESCRIPTION OF CHARACTERS

Figure 1:
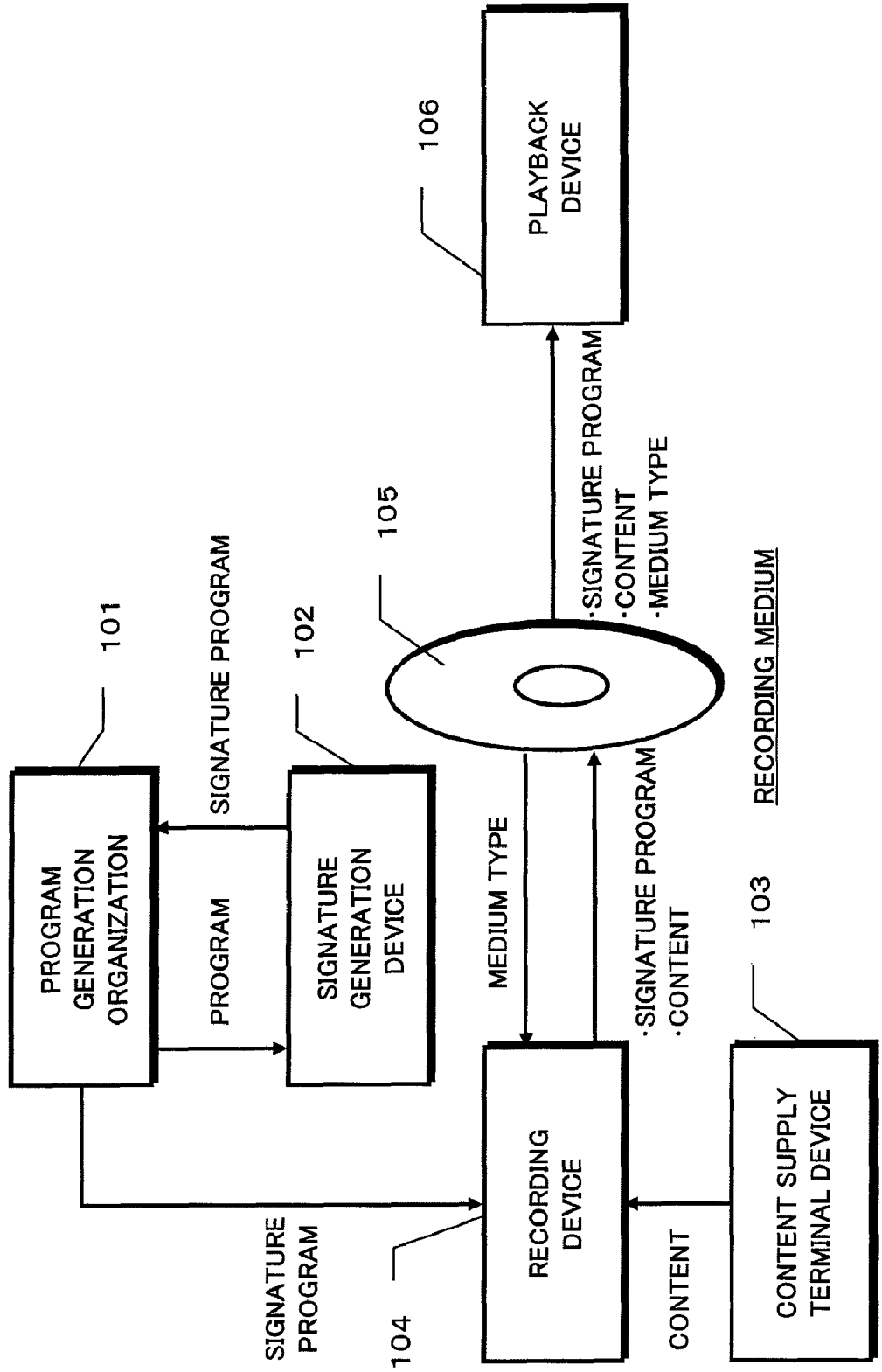
FIG. 1 is a block diagram showing the structure of a copyright protection data processing system according to a first embodiment of the present invention.

101: program generation organization
102: signature generation device
103: content provider terminal device
104: recording device
105: recording medium
106: playback device
1001: certification terminal device
1002: content provider terminal device
1003: recording medium
1004: playback device

DETAILED DESCRIPTION OF THE INVENTION

The following describes an embodiment of the present invention with reference to the drawings.

First Embodiment 1.1 Structure of Copyright Protection Data Processing System

A copyright protection data processing system according to a first embodiment of the present invention includes, as shown in FIG. 1, a program generation organization 101, a signature generation device 102, a content provider terminal device 103, a recording device 104, a recording medium 105, and a playback device 106.

The program generation organization 101 generates a program necessary for playing back a content, transmits the generated program to the signature generation device 102, and receives a signature program having a signature attached thereto from the signature generation device 102.

The recording device 104 receives the signature program from the program generation organization 101, and receives a content protected by the signature program from the content provider terminal device 103. Furthermore, the recording device 104 reads, from the recording medium 105, medium type information showing a medium type of the recording medium 105, and determines whether to permit recording of the received content. If determining to permit recording of the content, the recording device 104 records the received signature program and content in the recording medium 105.

The playback device 106 reads, from the recording medium 105, the signature program, the content, and the medium type information showing the medium type of the recording medium 105. Then, the playback device 106 determines whether to permit playback of the received content. If determining to permit playback of the content, the playback device 106 plays back the protected content by executing the signature program.

At this time, the content recorded in the recording medium 105 is protected by the program recorded in the same recording medium 105. As a method of protecting a content, it is possible to employ the structure in which a program calculates secret information in predetermined intervals, and encrypts the content using the secret information as key data, for example. An encryption technique used here may be a known method such as the DES encryption and the AES encryption. Furthermore, since an XOR operation based on the secret information may be employed instead of the encryption technique, the description of the method of content protection is omitted here.

1.2 Structure of Signature Generation Device 102

Figure 2:
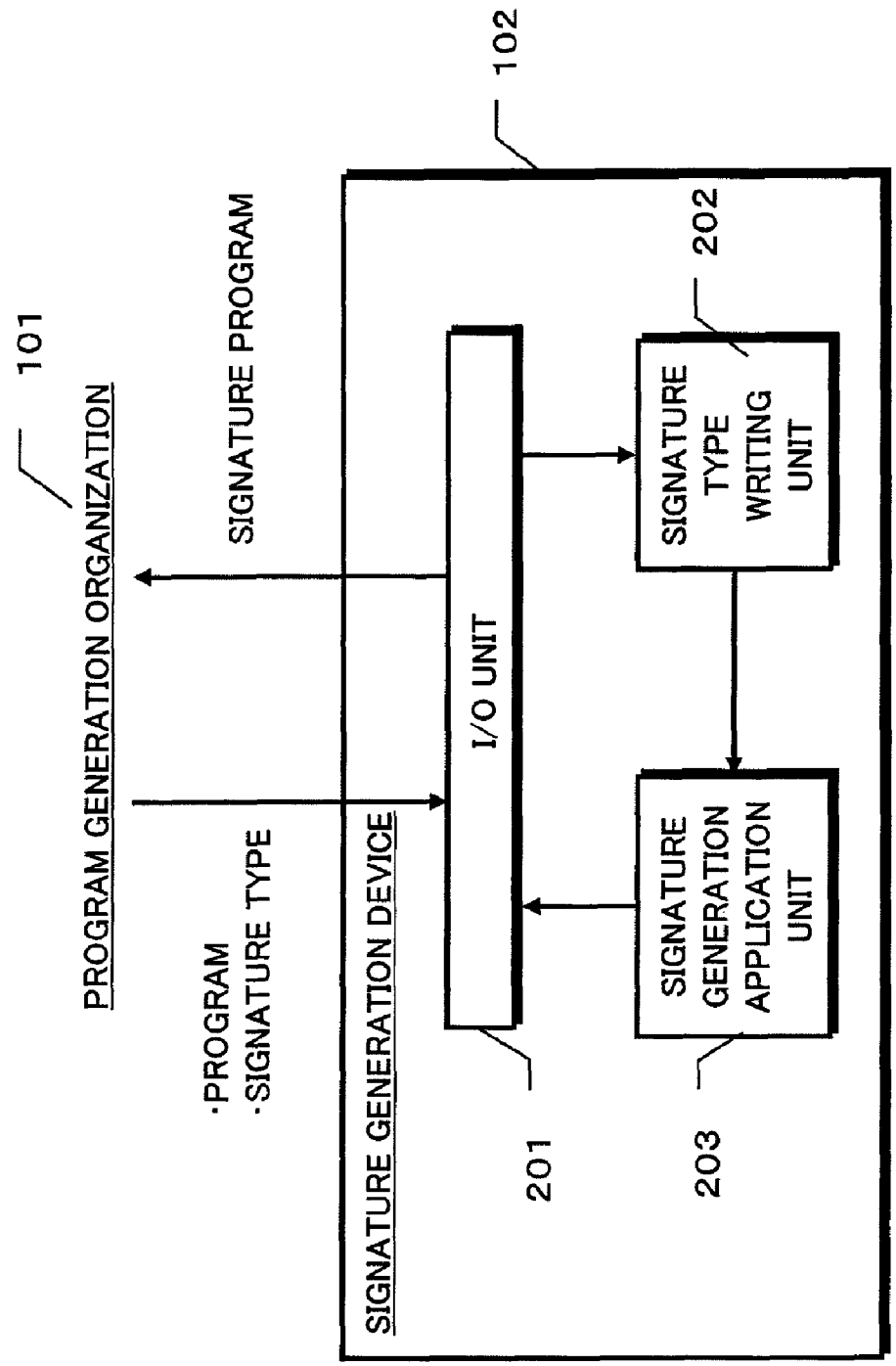
FIG. 2 is a block diagram showing the structure of a signature generation device according to the first embodiment.

The signature generation device 102 includes, as shown in FIG. 2, an I/O unit 201, a signature type writing unit 202, and a signature generation attachment unit 203.

The signature generation device 102 is specifically composed of a microprocessor, a RAM, a ROM, a hard disk, and the like, though not shown in the figure. A computer program is stored in the RAM, the ROM, and the hard disk. Functions of the signature generation device 102 are achieved by the microprocessor operating in accordance with the computer program.

Note that each of the functional units of the signature generation device 102, such as the I/O unit 201, the signature type writing unit 202, and the signature generation attachment unit 203, is typically realized as an LSI that is an integrated circuit. These functional units may be may be separately integrated into one chip, or integrated into one chip including part or all of the functional units.

Here, the LSI may be called an IC, a system LSI, a super LSI, and an ultra LSI, depending on the integration degree.

Also, a method of forming integrated circuits is not limited to LSIs, and may be realized using a dedicated circuit or a general-purpose processor. Furthermore, it is possible to form integrated circuits with use of an FPGA (Field Programmable Gate Array) programmable after manufacturing LSIs or a reconfigurable processor in which connection and setting of the circuit cell inside an LSI can be reconfigured.

Furthermore, when a new technology for forming integrated circuits that replaces LSIs becomes available as a result of progress in semiconductor technology or semiconductor-derived technologies, the functional units may be integrated using such technology. One possibility lies in adaptation of biotechnology.

Finally, the functional units may be realized with software, or by combining an LSI and software. Also, the software may be tamper-resistant.

(1) I/O Unit 201

The I/O unit 201 receives, from the program generation organization 101, a program to which a signature is to be attached and a request for signature type of the signature to be attached to the program (test release type or official release type).

Also, the I/O unit 201 receives, from the signature generation attachment unit 203, a program in which a signature generated by the signature generation attachment unit 203 is recorded, and transmits the received program to the program generation organization 101.

(2) Signature Type Writing Unit 202

The signature type writing unit 202 writes the requested signature type received by the I/O unit 201 into the program received by the I/O unit 201.

Figure 5:
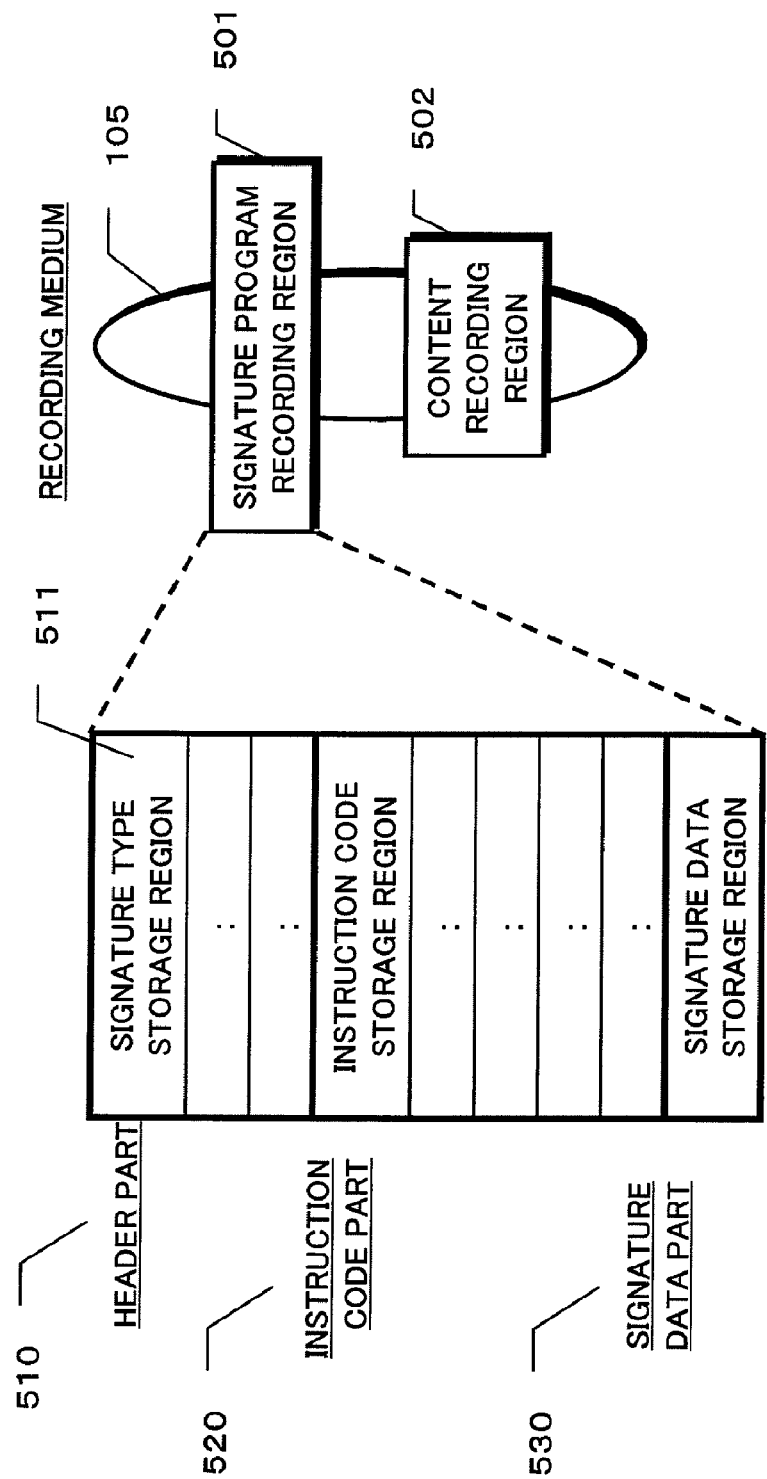
FIG. 5 shows an example of a signature program according to the first embodiment.

FIG. 5 shows an example of the data structure of a program. The program is composed of a header part 510, an instruction code part 520, and a signature data part 530. The signature type writing unit 202 writes the signature type requested by the program generation organization 101 into a signature type storage region 511 included in the header part 510. For example, if the test release type is requested, the signature type writing unit 202 writes signature type information "0x01" into the signature type storage region 511. If the official release type is requested, the signature type writing unit 202 writes signature type information "0x10" into the signature type storage region 511. Also, instruction codes are stored in an instruction code storage region included in the instruction code part 520. Furthermore, signatures generated by the signature generation device 102 are stored in a signature data storage region included in the signature data part 530.

(3) Signature Generation Attachment Unit 203

The signature generation attachment unit 203 generates a signature for the program into which the signature type is written, and records the generated signature in the signature data storage region included in the signature data part 530 of the program. Then, the signature generation attachment unit 203 transmits the program in which the generated signature is recorded (hereinafter, referred to as "signature program") to the I/O unit 201.

1.3 Structure of Recording Device 104

Figure 3:
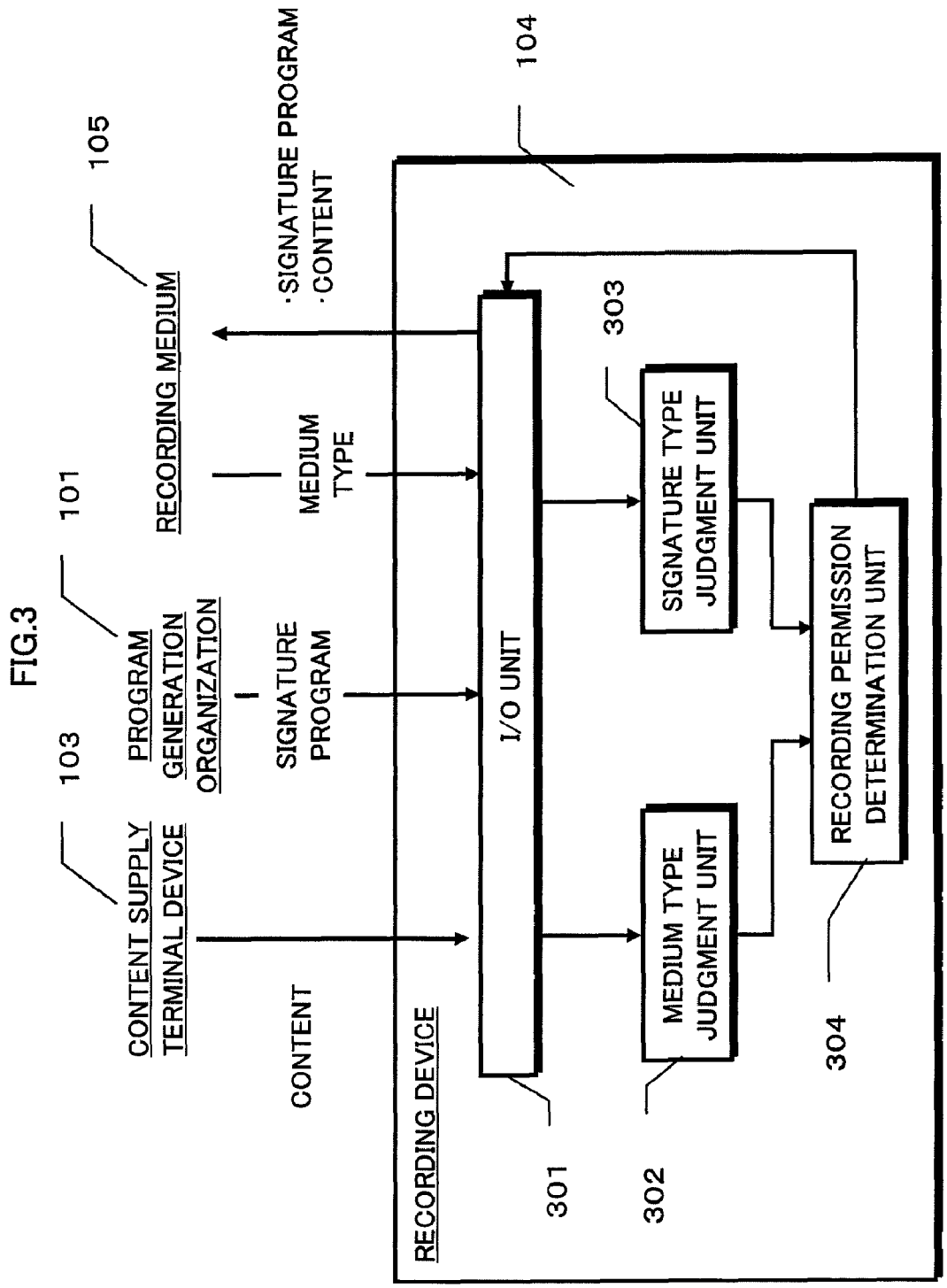
FIG. 3 is a block diagram showing the structure of a recording device according to the first embodiment.

The recording device 104 includes, as shown in FIG. 3, an I/O unit 301, a medium type judgment unit 302, a signature type judgment unit 303, and a recording permission determination unit 304.

The recording device 104 is specifically composed of a microprocessor, a RAM, a ROM, a hard disk, and the like, though not shown in the figure. A computer program is stored in the RAM, the ROM, and the hard disk. Functions of the recording device 104 are achieved by the microprocessor operating in accordance with the computer program.

Note that each of the functional units of the recording device 104, such as the I/O unit 301, the medium type judgment unit 302, the signature type judgment unit 303, and the recording permission determination unit 304, is typically realized as an LSI that is an integrated circuit. These functional units may be separately integrated into one chip, or integrated into one chip including part or all of the functional units.

Here, the LSI may be called an IC, a system LSI, a super LSI, and an ultra LSI, depending on the integration degree.

Also, a method of forming integrated circuits is not limited to LSIs, and may be realized using a dedicated circuit or a general-purpose processor. Furthermore, it is possible to form integrated circuits with use of an FPGA programmable after manufacturing LSIs or a reconfigurable processor in which connection and setting of the circuit cell inside an LSI can be reconfigured.

Furthermore, when a new technology for forming integrated circuits that replaces LSIs becomes available as a result of progress in semiconductor technology or semiconductor-derived technologies, the functional units may be integrated using such technology. One possibility lies in adaptation of biotechnology.

Finally, the functional units may be realized with software, or by combining an LSI and software. Also, the software may be tamper-resistant.

(1) I/O Unit 301

The I/O unit 301 receives a signature program from the program generation organization 101, and receives a content from the content provider terminal device 103, and furthermore reads medium type information from the recording medium 105.

Also, if judging to permit recording of the received content and signature program, the I/O unit 301 records the content and the signature program in the recording medium 105.

(2) Medium Type Judgment Unit 302

The medium type judgment unit 302 specifies a medium type based on the medium type information read by the I/O unit 301, and transmits the specified medium type to the recording permission determination unit 303.

Here, the medium type indicates a medium type of recording medium, such as a ROM (Read Only Memory), an R (Recordable), and an RW (ReWritable). Since the medium type can be identified with use of a known method such as an identification method that uses an identifier (ID) recorded on a recording medium, the description thereof is omitted here. In the following descriptions, identifiers "0x001", "0x010", and "0x100" are respectively recorded in the ROM, the R, and the RW, as an example.

(3) Signature Type Judgment Unit 303

The signature type judgment unit 304 reads signature type information stored in a signature type storage region 511 included in a header part 510 of the signature program received by the I/O unit 301, and specifies a signature type of the signature, and transmits the specified signature type to the recording permission determination unit 303.

(4) Recording Permission Determination Unit 304

The recording permission determination unit 304 determines whether to permit recording of the content and the signature program, based on both the medium type specified by the medium type judgment unit 302 and the signature type specified by the signature type judgment unit 303.

Specifically, if the medium type and the signature type are respectively specified as R (0x010) and test release type (0x01), the recording permission determination unit 304 permits recording of the content and the signature program in the recording medium. If the medium type and the signature type are respectively specified as R (0x010) and official release type (0x10), the recording permission determination unit 304 prohibits recording of the content and the signature program in the recording medium.

1.4 Structure of Playback Device 106

Figure 4:
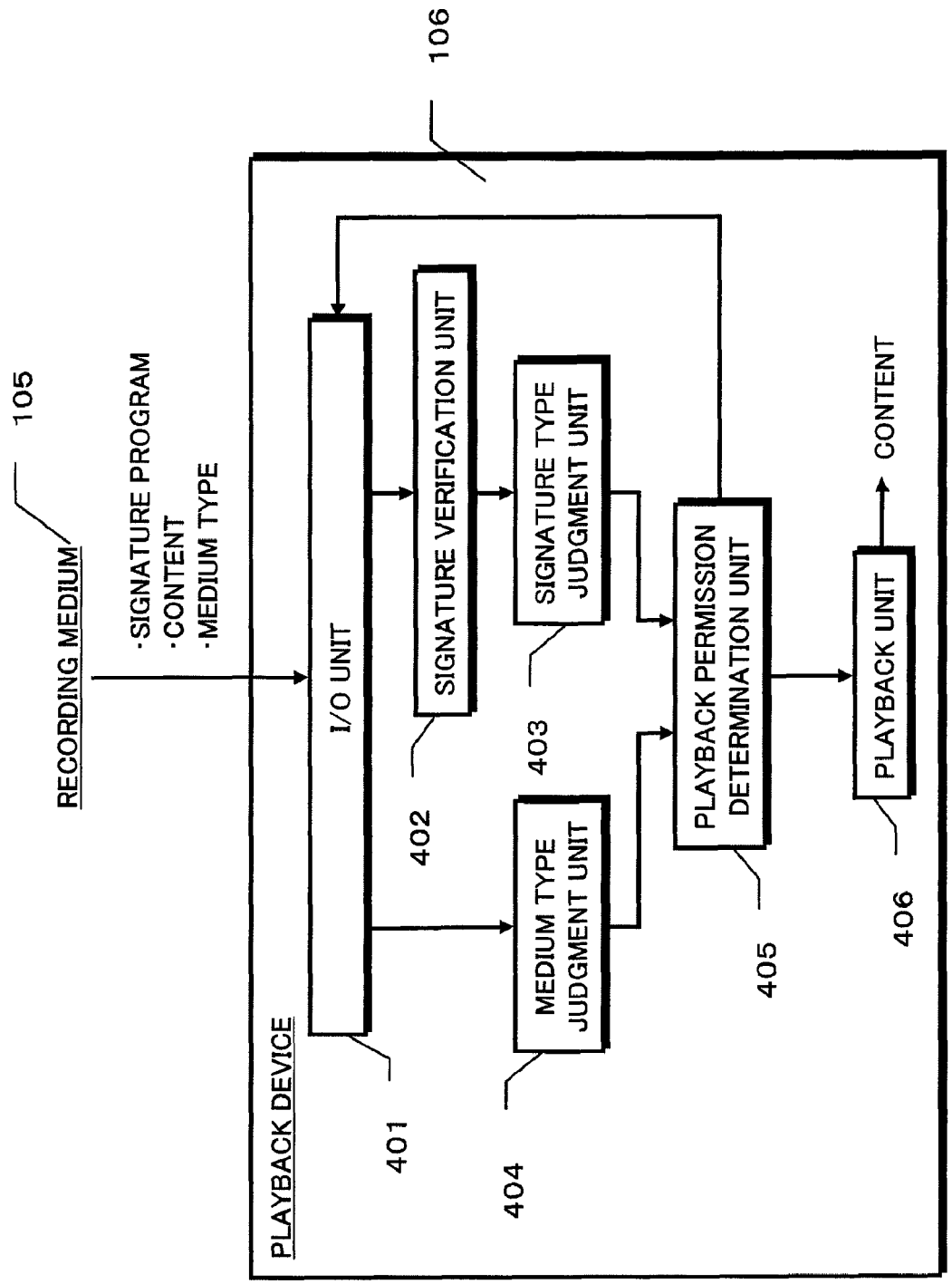
FIG. 4 is a block diagram showing the structure of a playback device according to the first embodiment.

The playback device 106 includes, as shown in FIG. 4, an I/O unit 401, a signature verification unit 402, a signature type judgment unit 403, a medium type judgment unit 404, a playback permission determination unit 405, and a playback unit 406.

The playback device 106 is specifically composed of a microprocessor, a RAM, a ROM, a hard disk, and the like, though not shown in the figure. A computer program is stored in the RAM, the ROM, and the hard disk. Functions of the playback device 106 are achieved by the microprocessor operating in accordance with the computer program.

Figure 9:
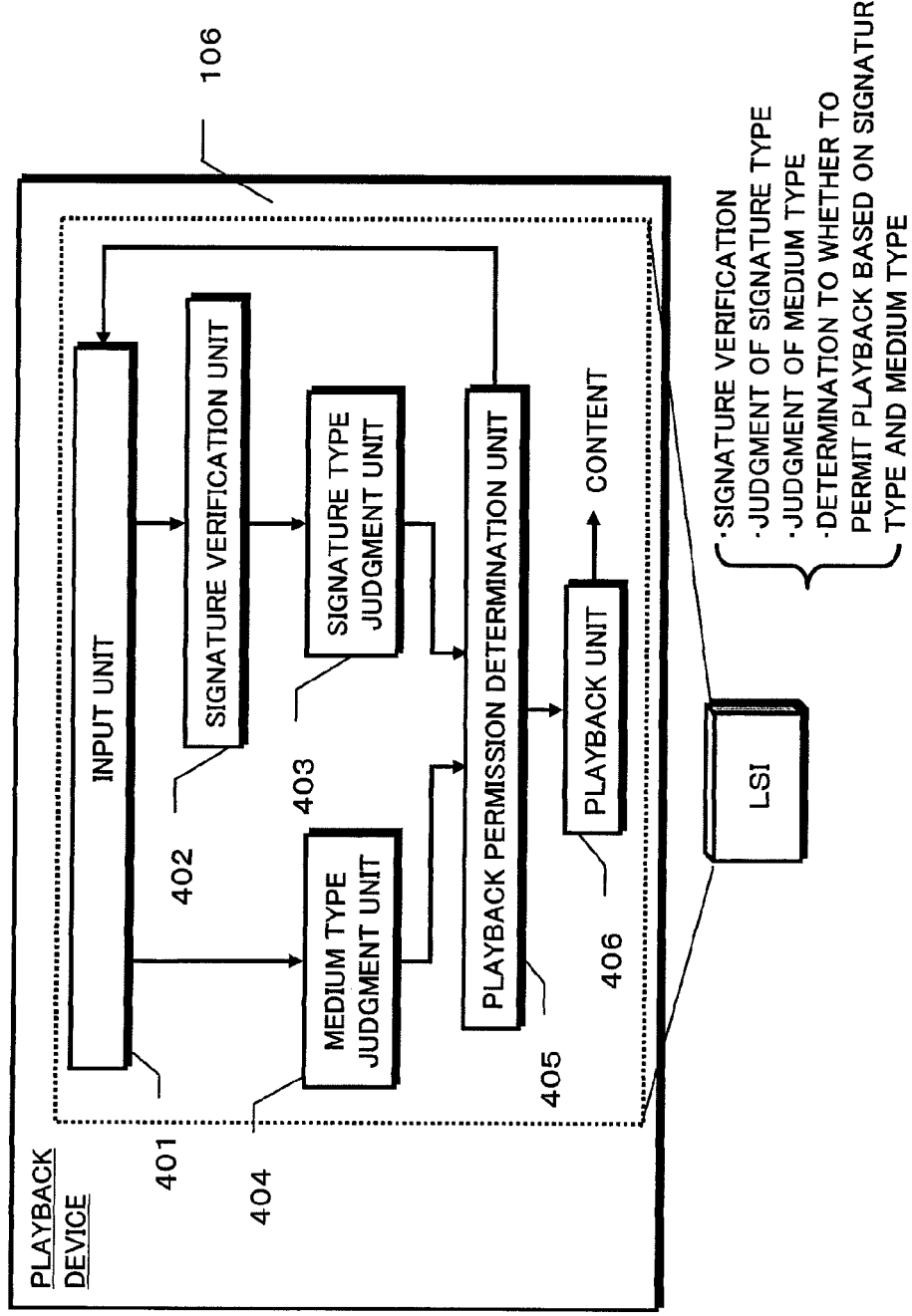
FIG. 9 shows the structure of an LSI realizing the functions of the playback device according to the first embodiment.

Note that each of the functional units of the playback device 106, such as the I/O unit 401, the signature verification unit 402, the signature type judgment unit 403, the medium type judgment unit 404, the playback permission determination unit 405, and the playback unit 406, is typically realized an LSI that is an integrated circuit. These functional units may be separately integrated into one chip, or integrated into one chip including part or all of the functional units. FIG. 9 shows an example of the manufacture of the system LSI. In FIG. 9, the functional units surrounded by a dashed line are integrated into one chip as an LSI.

Here, the LSI may be called an IC, a system LSI, a super LSI, and an ultra LSI, depending on the integration degree.

Also, a method of forming integrated circuits is not limited to LSIs, and may be realized using a dedicated circuit or a general-purpose processor. Furthermore, it is possible to form integrated circuits with use of an FPGA programmable after manufacturing LSIs or a reconfigurable processor in which connection and setting of the circuit cell inside an LSI can be reconfigured.

Furthermore, when a new technology for forming integrated circuits that replaces LSIs becomes available as a result of progress in semiconductor technology or semiconductor-derived technologies, the functional units may be integrated using such technology. One possibility lies in adaptation of biotechnology.

Finally, the functional units may be realized with software, or by combining an LSI and software. Also, the software may be tamper-resistant.

(1) I/O Unit 401

The I/O unit 401 reads a signature program, a content, and medium type information from the recording medium 105, and transmits the read signature program to the signature verification unit 402, and transmits the read medium type information to the medium type judgment unit 404.

(2) Signature Verification Unit 402

The signature verification unit 402 verifies a signature stored in a signature data part 530 of a signature program read by the I/O unit 401, and judges whether the program is an authentic program. Also, it is possible to check the completeness of the program by performing signature verification. For example, it is possible to check whether signature type information stored in a signature type storage region 511 included in a header part 510 of the program is not tampered with. If judging that the program is not an authentic program as a result of the signature verification, the playback device 106 does not perform subsequent playback processing, and stops the operations.

(3) Signature Type Judgment Unit 403

The signature type judgment unit 403 reads the signature type information stored in the signature type storage region 511 included in the header part 510 of the signature program received by the I/O unit 401 to specify a signature type, and transmits the specified signature type to the playback permission determination unit 405.

(4) Medium Type Judgment Unit 404

The medium type judgment unit 404 specifies a medium type based on the medium type information read by the I/O unit 401, and transmits the specified medium type to the playback permission determination unit 405.

Here, the medium type indicates a medium type of recording medium, such as a ROM (Read Only Memory), an R (Recordable), and an RW (ReWritable). Since the medium type can be identified with use of a known method such as an identification method that uses an identifier (ID) recorded on a recording medium, the description thereof is omitted here. In the following descriptions, identifiers "0x001", "0x010", and "0x100" are respectively recorded in the ROM, the R, and the RW, as an example.

(5) Playback Permission Determination Unit 405

The playback permission determination unit 405 determines whether to permit playback of the content using the signature program, based on both the medium type specified by the medium type judgment unit 404 and the signature type specified by the signature type judgment unit 403.

Specifically, if the medium type and the signature type are respectively specified as R (0x010) and test release type (0x01), the playback permission determination unit 405 permits playback of the content. If the medium type and the signature type are respectively specified as R (0x010) and official release type (0x10), the playback permission determination unit 405 prohibits playback of the content. This is because the combination of R and test release type indicates that the recording medium is an R medium manufactured for test purpose in the manufacturing process of a ROM medium, and the combination of R and official release signature indicates that the recording medium is an R medium manufactured by copying a ROM medium in an unauthorized manner.

(6) Playback Unit 406

If the playback permission determination unit 405 permits playback of the content, the playback unit 406 executes a signature program read from the recording medium 105, in an execution environment thereof. Then, the playback unit 406 descrambles the content that has been scrambled (data that has been modified) based on secret information calculated using the program, so as to play back the content.

1.5 Operations of Signature Generation Device 102

Figure 6:
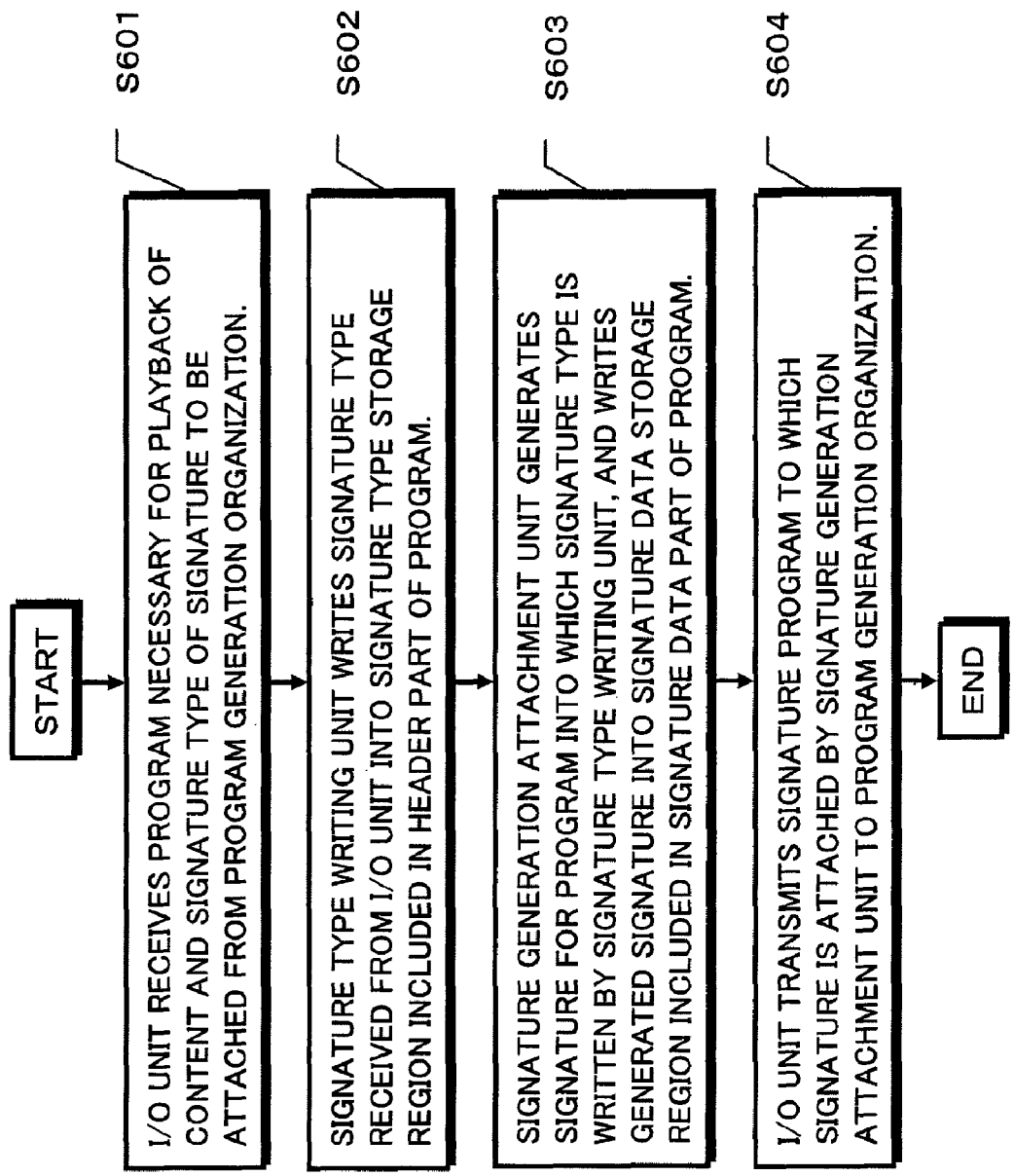
FIG. 6 shows the operations of the signature generation device according to the first embodiment.

The operations of the signature generation device 102 are described with reference to FIG. 6.

The I/O unit 201 included in the signature generation device 102 receives, from the program generation organization 101, a program necessary for playing back a content and a request for signature type of a signature to be attached to the program (test release type or official release type) (Step S601). Based on the requested signature type received from the I/O unit 201, the signature type writing unit 202 writes signature type information into the signature type storage region 511 included in the header part 510 of the received program ("0x01" in case of test release type and "0x10" in case of official release signature) (Step S602).

The signature generation attachment unit 203 generates a signature for the program into which the signature type information is written by the signature type writing unit 202 in Step S602, and writes the generated signature into the signature data storage region included in the signature data part 530 of the program (Step S603). The I/O unit 201 transmits the signature program to which the signature is attached by the signature generation attachment unit 203 to the program generation organization 101 (Step S604).

1.6 Operations of Recording Device 104

Figure 7:
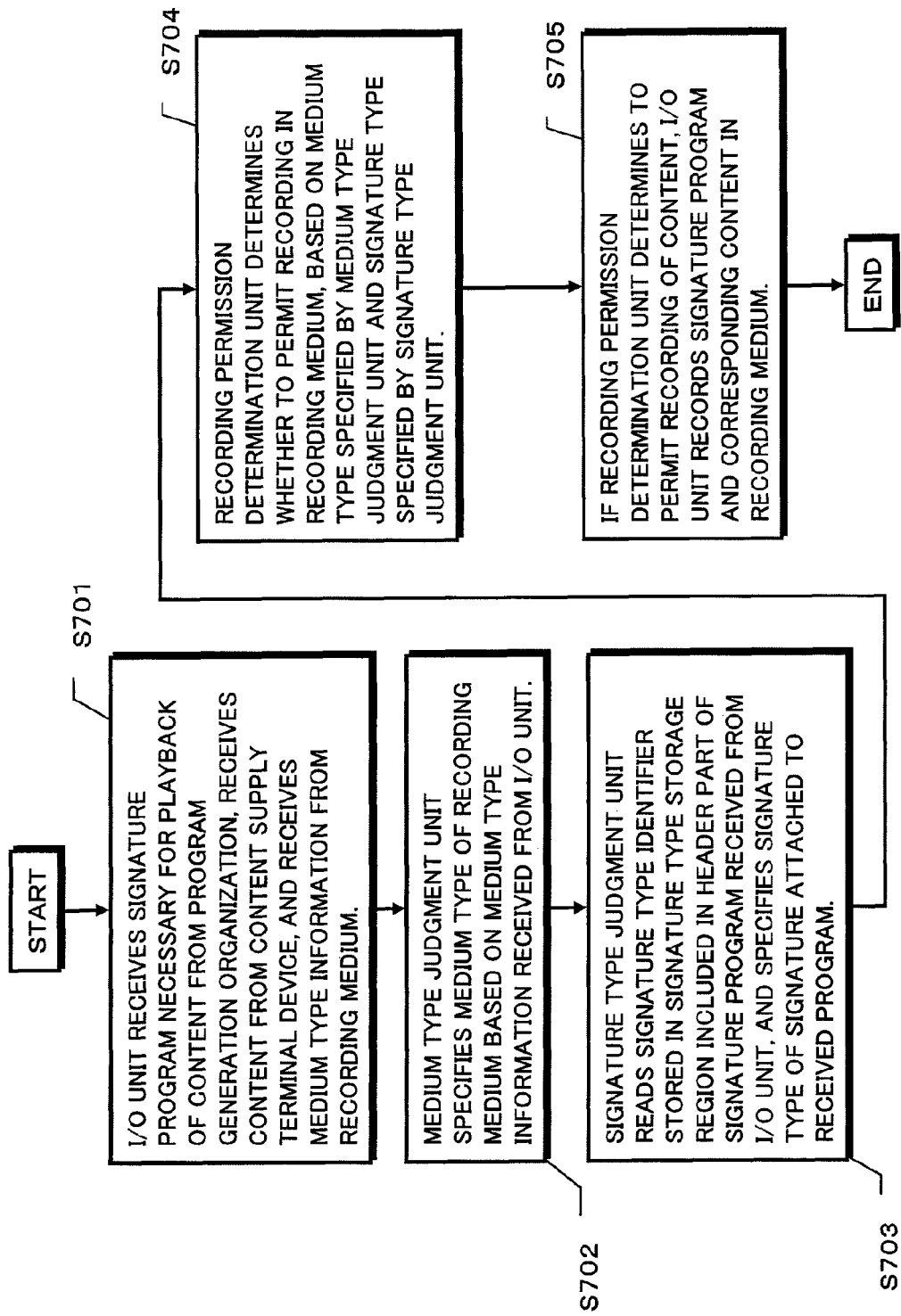
FIG. 7 shows the operations of the recording device according to the first embodiment.

The operations of the recording device 104 are described with reference to FIG. 7.

The I/O unit 301 included in the recording device 104 receives the signature program necessary for playing back the content from the program generation organization 101, receives the content from the content provider terminal device 103, and receives medium type information from the recording medium 105 (Step S701). The medium type judgment unit 302 specifies a medium type of the recording medium (for example, ROM, R, or RW) based on the medium type information received from the I/O unit 301, and transmits the specified medium type to the recording permission determination unit 304 (Step S702).

The signature type judgment unit 303 reads signature type information stored in the signature type storage region 511 included in the header part 510 of the signature program received from the I/O unit 301, and specifies a signature type of the signature attached to the received program (test release type or official release type), and transmits the specified signature type to the recording permission determination unit 304 (Step S703). Based on both the medium type received from the medium type judgment unit 302 and the signature type received from the signature type judgment unit 303, the recording permission determination unit 304 determines whether to permit recording of the received signature program and content in the recording medium 105 (Step S704).

If the recording permission determination unit 304 determines to permit recording of the content, the I/O unit 301 records the signature program and the corresponding content in the recording medium 105 (Step S705).

1.7 Operations of Playback Device 106

Figure 8:
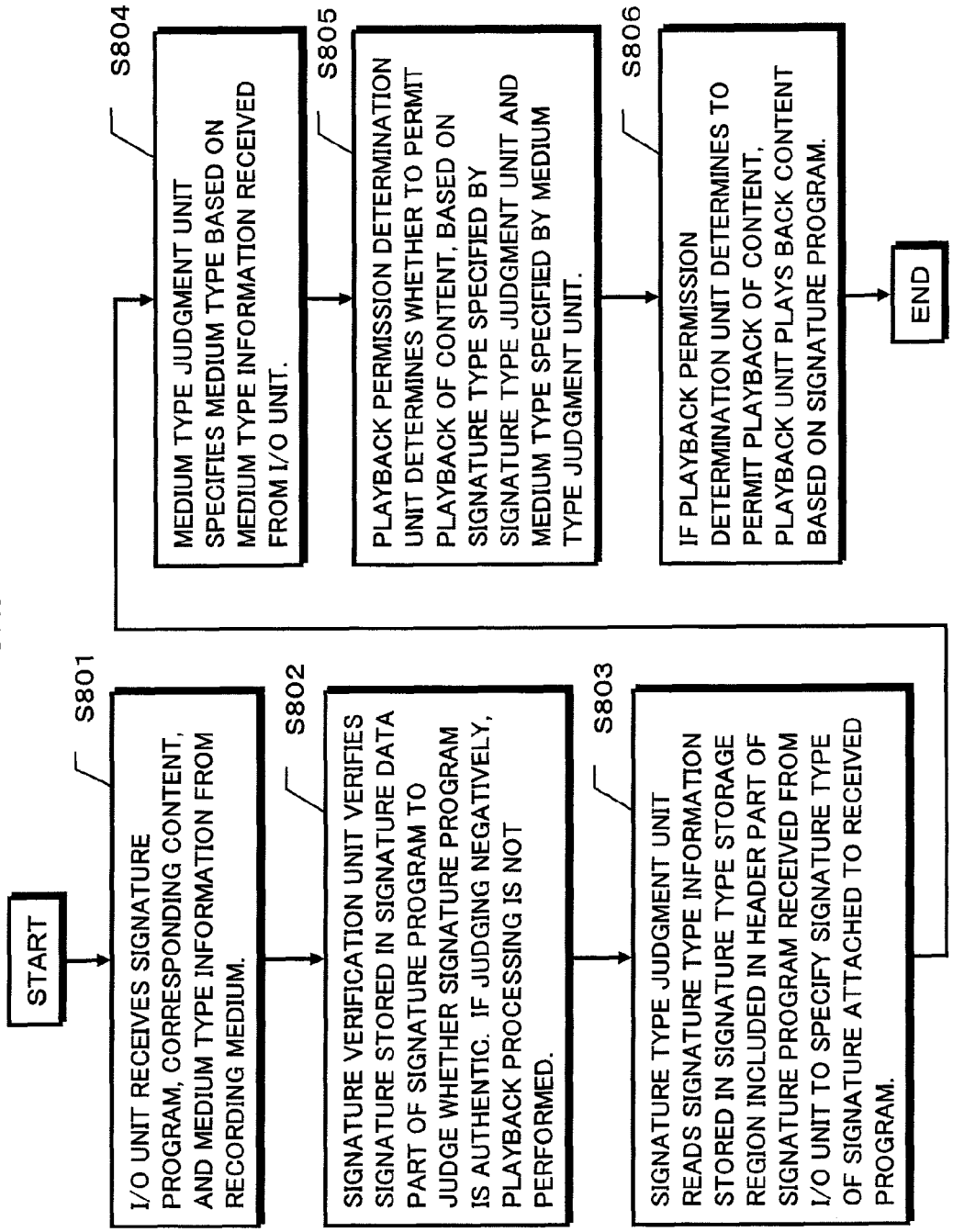
FIG. 8 shows the operations of the playback device according to the first embodiment.

The operations of the playback device 106 are described with reference to FIG. 8.

The I/O unit 401 included in the playback device 106 reads the signature program necessary for playing back the content, the corresponding content, and the medium type information from the recording medium 105 (Step S801). The signature verification unit 402 verifies the signature stored in the signature data part 530 of the signature program received from the I/O unit 401, to judge whether the signature program is an authentic program. If judging that the program is not an authentic program, the subsequent playback processing is not performed (Step S802).

The signature type judgment unit 403 reads signature type information stored in the signature type storage region 511 included in the header part 510 of the signature program received from the I/O unit 401 to specify the signature type of the signature attached to the received program (test release type or official release type), and transmits the specified signature type to the playback permission determination unit 405 (Step S803). The medium type judgment unit 404 specifies a medium type (ROM, R, or RW, for example) based on the medium type information received from the I/O unit 401, and transmits the specified medium type to the playback permission determination unit 405 (Step S804).

The playback permission determination unit 405 determines whether to permit playback of the received content, based on both the recording medium received from the medium type judgment unit 404 and the signature type received from the signature type judgment unit 403 (Step S805). If the playback permission determination unit 405 determines to permit playback of the content, the playback unit 406 executes the signature program read from the recording medium 105 in an execution environment included in the playback unit 406, and the playback unit 406 descrambles the content that has been scrambled (data that has been modified) based on secret information calculated using the program, so as to play back the content (Step S806).

Modification Examples

While the present invention has been described based on the above embodiment, the present invention is of course not limited to the above embodiment. The present invention also includes the following cases.

(1) In the above embodiment, the signature generation device receives a request for signature type, and writes the signature type into a program which is received together with the request. The present invention is not limited to this structure. Alternatively, the following structure may be employed, for example: the signature generation device stores therein both a pair of public keys for signatures having test release type and a pair of public keys for signatures having official release type, and uses a different key for generating a signature depending on a requested signature type instead of writing signature type information. Further alternatively, the following structure may be employed: the signature generation device writes signature type information into a header part of a program, and furthermore uses a different key for generating a signature depending on a requested signature type.

(2) In the above embodiment, the two signature types are used, namely the test release type and the official release type. The present invention is not limited to this structure. Alternatively, it may be employ two or more types, such as a test release type for ROM media, a test release type for R media, an official release type for ROM media, and downloaded content type, instead of the test release type and the official release type. Similarly, the medium type is not limited to the three types, namely the ROM, the R, and the RW. Furthermore, the present invention is not limited to the structure in which a judgment on whether test release type or official release type is made based on a signature type of a signature attached to a program. Alternatively, it may be possible to employ the structure, for example, in which a signature is attached not to a program but to a content, and the judgment is made based on a signature type of the signature attached to the content. Further alternatively, the judgment may be made based on information recorded in the recording medium independently from the content and the program. In other words, as long as information that enables appropriate judgment on whether test release type or official release type is recorded in the recording medium, the information does not necessarily need to be in a form of signature type.

(3) In the above embodiment, a content recorded in a recording medium is protected by a program recorded in the same recording medium. The present invention is not limited to this structure. Alternatively, the following structure may be employed. For example, in addition to protection of the content by a program (for example, with use of secret information calculated by operations of the program, the content is scrambled or values of data are partially modified), the content is further protected by being encrypted. Further alternatively, the content may be protected using two or more copyright protection techniques. In this case, the recording permission determination unit of the recording device and the playback permission determination unit of the playback device may respectively determine whether to permit recording and playback of the content, based on whether the content is encrypted using a second copyright protection technique or whether the content has a signature attached thereto using the second copyright protection technique, in addition to the medium type and the signature type. Here, the second copyright protection technique is a protection technique other than the protection technique using program described in the above embodiment. As the second protection technique, it may be possible to use a known protection technique such as a protection technique using content encryption. Accordingly, the description thereof is omitted here. For example, if the medium type and the signature type are respectively specified as R and official release and the content is encrypted using the second copyright protection technique or the content has a signature attached thereto using the second copyright protection technique, the recording permission determination unit and the playback permission determination unit respectively may permit recording and playback of the content. Also, if the medium type and the signature type are respectively specified as R and official release, and the content is not encrypted using the second copyright protection technique, and the content does not have a signature attached thereto using the second copyright protection technique, the recording permission determination unit and the playback permission determination unit respectively may prohibit recording and playback of the content.

(4) In the above embodiment, the recording device determines whether to permit recording of a content based on both a medium type and a signature type. The present invention is not limited to this structure. Alternatively, whether to permit recording may be determined based on one of the medium type and the signature type. Further alternatively, the following system may be employed. For example, the recording device records the content without making a determination on whether to permit recording of the content, and then the playback device determines whether to permit playback of the content. Further alternatively, after verifying a signature attached to the program, the recording device may determine whether to permit recording of the content by specifying a signature type of the attached signature.

(5) In the above embodiment, after verifying a signature, the playback device specifies a signature type of the signature. The present invention is not limited to this structure. Alternatively, the following structure may be employed, for example: after specifying the signature type, the playback device verifies the signature. Further alternatively, in the structure in which keys for generating signatures differ between signature types, the playback device may verify the signature using a key corresponding to the specified signature type. The same also applies to the case of recording by the recording device.

(6) In the above embodiment, the playback device determines whether to permit playback of a content based on a medium type and a signature type. The present invention is not limited to this structure. Alternatively, the following structure may be employed. For example, if the medium type is judged to be a ROM, the playback device verifies a signature. If the program is judged to be an authentic program as a result of the verification, the playback device permits playback of the content, regardless of which signature type the signature has. On the other hand, if the medium type is judged to be a medium other than a ROM, the playback device determines whether to permit playback of the content with reference to the signature type. In this way, the step of referring to the signature type may be skipped depending on the judged medium type. Furthermore, the step of referring to the medium type may be skipped depending on the specified signature type, conversely. Moreover, if an encryption method or a signature method according to the second copyright protection technique is used for protecting a content, the step of referring to the medium type or the step of referring to the signature type may be skipped depending on whether the content is protected using the second copyright protection technique. The same also applies to the case of recording by the recording device.

(7) In the above embodiment, the recording device records a content and a program in a recording medium, and transmits the recorded content and program to the playback device. The present invention is not limited to this structure. Alternatively, for example, only the content may be recorded in the recording medium, and the program may be transmitted to the playback device via a network. Further alternatively, only the program may be recorded in the recording medium, and the content may be transmitted to the playback device via a network, on the contrary. Further alternatively, both the content and the program may be transmitted to the playback device via a network without being recorded in the recording medium. In this case, judgment on whether to permit playback of the content is made based on the signature type and whether the content is protected (the content is encrypted or has a signature attached thereto) using the second copyright protection technique.

(8) The recording device according to the above embodiment may include an instruction reception unit operable to receive one of an instruction to encrypt a content or an instruction to generate a signature for the content and attach the generated signature to the content or receive a signature for the content and attach the received signature to the content. The recording device may determine whether to permit recording of the content, based on the above received instruction in addition to the medium type and the signature type.

(9) All or part of the functional units of each of the above devices may be composed of a removable IC card or a single module. The IC card or the single module is a computer system composed of a microprocessor, a ROM, a RAM, and the like. The IC card or the module may include a super-multifunctional LSI. Functions of the IC card or the module are achieved by the microprocessor operating in accordance with the computer program. The IC card or the module may be tamper-resistant.

(10) The present invention may be the above methods. Also, the present invention may be a computer program that realizes the methods by a computer, or a digital signal composed of the computer program.

Furthermore, the present invention may be a computer-readable storage medium such as a flexible disk, a hard disk, a CD-ROM, an MO, a DVD, a DVD-ROM, a DVD-RAM, a BD (Blu-ray Disc), and a semiconductor memory, which stores the computer program or the digital signal. Furthermore, the present invention may be the computer program or the digital signal stored on the storage medium.

Furthermore, the present invention may be the computer program or the digital signal transmitted via an electric communication network, a wireless or wired communication network, a network such as Internet, data broadcasting, and the like.

Furthermore, the present invention may be a computer system that includes a microprocessor and a memory, and the microprocessor may operate in accordance with the computer program, and the memory may store therein the computer program.

Furthermore, the program or the digital signal may be executed by another independent computer system, by transferring the program or the digital signal to the recording medium, or by transferring the program or the digital signal via a network or the like.

(11) The present invention also includes the following cases.

Second Embodiment 2.1 Structure of Copyright Protection Data Processing System

Figure 10:
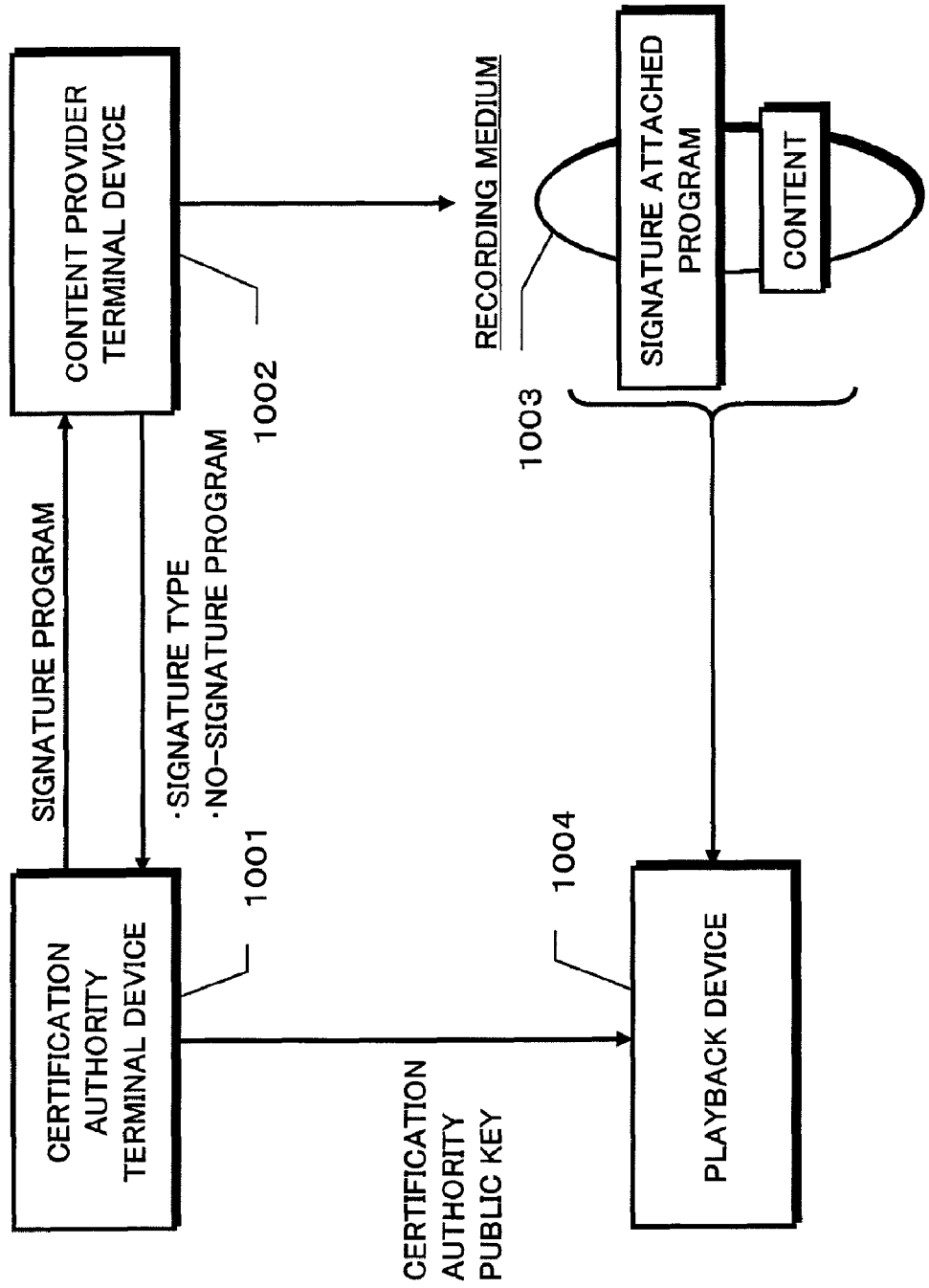
FIG. 10 is a block diagram showing the structure of a copyright protection data processing system according to a second embodiment.

The copyright protection data processing system is composed of, as shown in FIG. 10, a certification authority terminal device 1001, a content provider terminal device 1002, a recording medium 1003, and a playback device 1004.

The certification authority terminal device 1001 provides the playback device 1004 with a public key (certification authority public key) stored in the certification authority. Furthermore, the certification authority terminal device 1001 receives a program to which a digital signature is not attached (hereinafter "no-signature program") from the content provider terminal device, and provides the content provider terminal device 1002 with a program to which a digital signature is attached using a secret key stored in the certification authority (hereinafter "signature program").

The content provider terminal device 1002 generates a program necessary for playing back a content, and transmits the generated program to the certification authority terminal device 1001. Also, the content provider terminal device 1002 receives the program to which a digital signature is attached (hereinafter, "signature program") from the certification authority terminal device 1001, and records the received signature program in the recording medium 1003. Furthermore, the content provider terminal device 1002 records a content that has been encrypted in the recording medium 1003. Note that it is unnecessary to encrypt the content. Here, the program recorded in the recording medium 1003 is a program to be used for playing back the content. For example, the program has a security function of detecting a status in which the playback device 1004 is maliciously analyzed, the safety problem, and an abnormal status in which key data to be stored in the playback device 1004 is damaged, a navigation function of displaying and controlling a screen for user operation, and a menu function.

The playback device 1004 reads the signature program and the content from the recording medium 1003, and further reads medium type information showing a medium type of the recording medium, and determines whether to permit playback of the read content. If judging to permit playback of the content, the playback device 1004 plays back the protected content by executing the signature program.

At this time, the content recorded in the recording medium 1003 is protected by the program recorded in the same recording medium 1003. As a method of protecting a content, it is possible to employ the structure in which a program calculates secret information in predetermined intervals, and encrypts the content using the secret information as key data, for example. An encryption technique used here may be a known method such as the DES encryption and the AES encryption. Furthermore, since an XOR operation based on the secret information may be employed instead of the encryption technique, the description of the method of content protection is omitted here.

2.2 Structure of Certification Authority Terminal Device 1001

Figure 11:
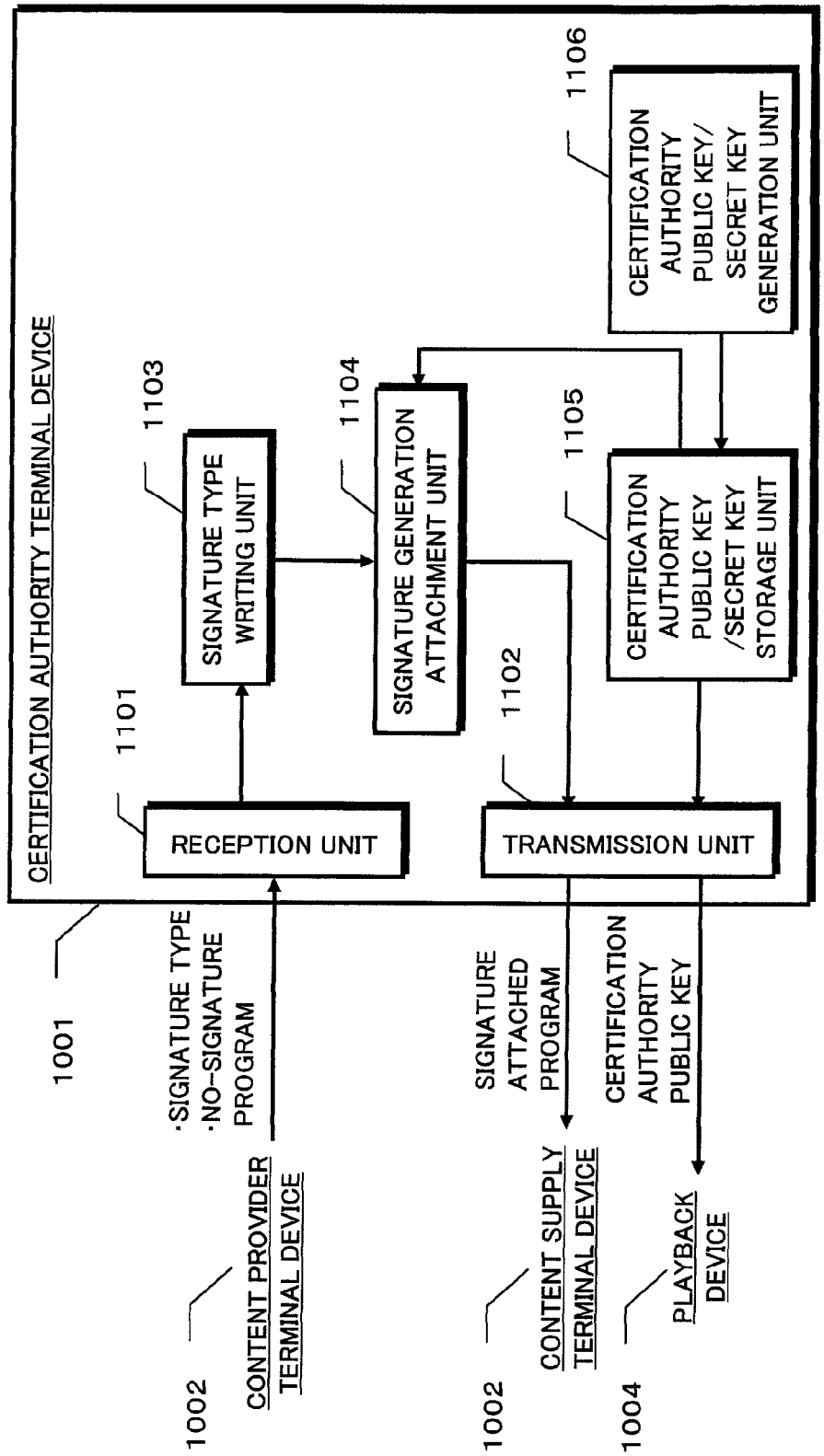
FIG. 11 is a block diagram showing a certification terminal device according to the second embodiment.

The certification authority terminal device 1001 includes, as shown in FIG. 11, a reception unit 1101, a transmission unit 1102, a signature type writing unit 1103, a signature generation attachment unit 1104, a certification authority public key/secret key storage unit 1105, and a certification authority public key/secret key generation unit 1106.

The certification authority terminal device 1001 is specifically composed of a microprocessor, a RAM, a ROM, a hard disk, and the like, though not shown in the figure. A computer program is stored in the RAM, the ROM, and the hard disk. Functions of the certification authority terminal device 1001 are achieved by the microprocessor operating in accordance with the computer program.

Note that each of the functional units of the certification authority terminal device 1001, such as the reception unit 1101, the transmission unit 1102, the signature type writing unit 1103, the signature generation attachment unit 1104, the certification authority public key/secret key storage unit 1105, and the certification authority public key/secret key generation unit 1106, is typically realized as an LSI that is an integrated circuit. These functional units may be separately integrated into one chip, or integrated into one chip including part or all of the functional units.

Here, the LSI may be called an IC, a system LSI, a super LSI, and an ultra LSI, depending on the integration degree.

Also, a method of forming integrated circuits is not limited to LSIs, and may be realized using a dedicated circuit or a general-purpose processor. Furthermore, it is possible to form integrated circuits with use of an FPGA (Field Programmable Gate Array) programmable after manufacturing LSIs or a reconfigurable processor in which connection and setting of the circuit cell inside an LSI can be reconfigured.

Furthermore, when a new technology for forming integrated circuits that replaces LSIs becomes available as a result of progress in semiconductor technology or semiconductor-derived technologies, the functional units may be integrated using such technology. One possibility lies in adaptation of biotechnology.

Finally, the functional units may be realized with software, or by combining an LSI and software. Also, the software may be tamper-resistant.

(1) Reception Unit 1101

The reception unit 1101 receives, from the content provider terminal device 1002, a no-signature program and a request for signature type of a signature to be attached to the no-signature program (test release type or official release type).

(2) Transmission Unit 1102

The transmission unit 1102 transmits a signature program received from the signature generation attachment unit 1104 to the content provider terminal device 1002.

Furthermore, the transmission unit 1102 transmits a certification authority public key generated by the certification authority public key/secret key generation unit 1107 to the playback device 1004.

(3) Signature Type Writing Unit 1103

The signature type writing unit 1103 writes a signature type received by the reception unit 1101 into a program received by the reception unit 1101.

Figure 13:
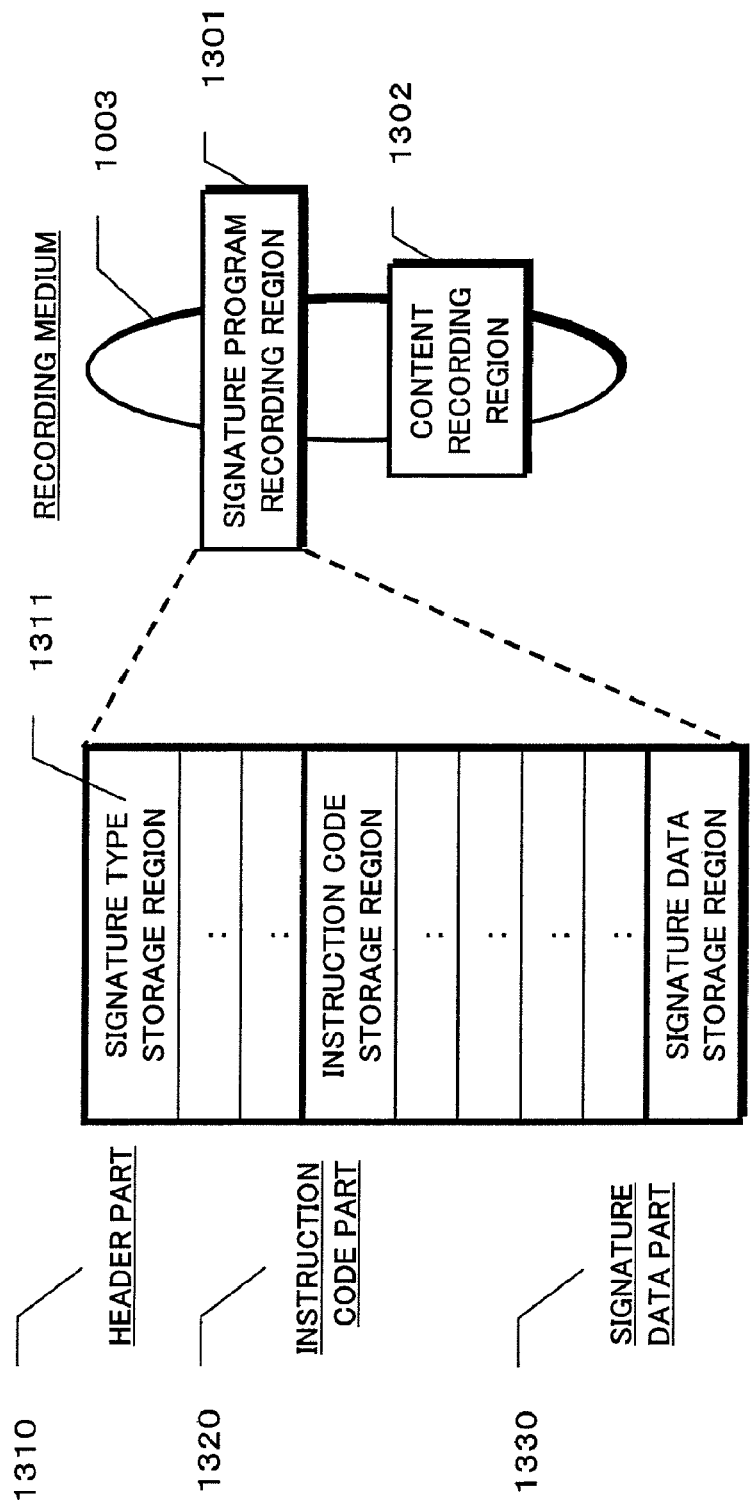
FIG. 13 is a block diagram showing a signature program according to the second embodiment.

FIG. 13 shows an example of the data structure of a program. The program is composed of a header part 1310, an instruction code part 1320, and a signature data part 1330. The signature type writing unit 1103 writes the signature type requested by the program generation organization 101 into a signature type storage region 1311 included in the header part 1310. For example, if the test release type is requested, the signature type writing unit 1103 writes signature type information "0x01" into the signature type storage region 1311. If the official release type is requested, the signature type writing unit 1103 writes signature type information "0x10" into the signature type storage region 1311. Also, instruction codes are stored in an instruction code storage region included in the instruction code part 1320. Furthermore, signatures generated by the signature generation attachment unit 1104 are stored in a signature data storage region included in the signature data part 1330.

(4) Signature Generation Attachment Unit 1104

The signature generation attachment unit 1104 generates a signature for a program into which a signature type is written, with use of a certification authority secret key stored in the certification authority public key/secret key storage unit 1105. Then, the signature generation attachment unit 1104 records the generated signature in the signature data storage region included in the signature data part 1330 of the program. The program in which the generated signature is recorded (hereinafter, "signature program") is transmitted to the content provider terminal device 1002 via the transmission unit 1102.

(5) Certification Authority Public Key/Secret Key Storage Unit 1105

The certification authority public key/secret key storage unit 1105 stores therein a pair of a certification authority public key and a certification authority secret key generated by the certification authority public key/secret key generation unit 1106. The certification authority public key is transmitted to the playback device 1004 via the transmission unit 1102. The certification authority secret key is used by the signature generation attachment unit 1104 for generating a signature in the certification authority terminal device 1001.

(6) Certification Authority Public Key/Secret Key Generation Unit 1106

The public key/secret key generation unit 1106 generates a pair of a certification authority public key to be transmitted to the playback device 1004 and a secret key corresponding to the certification authority public key.

2.3 Structure of Content Provider Terminal Device 1002

Figure 12:
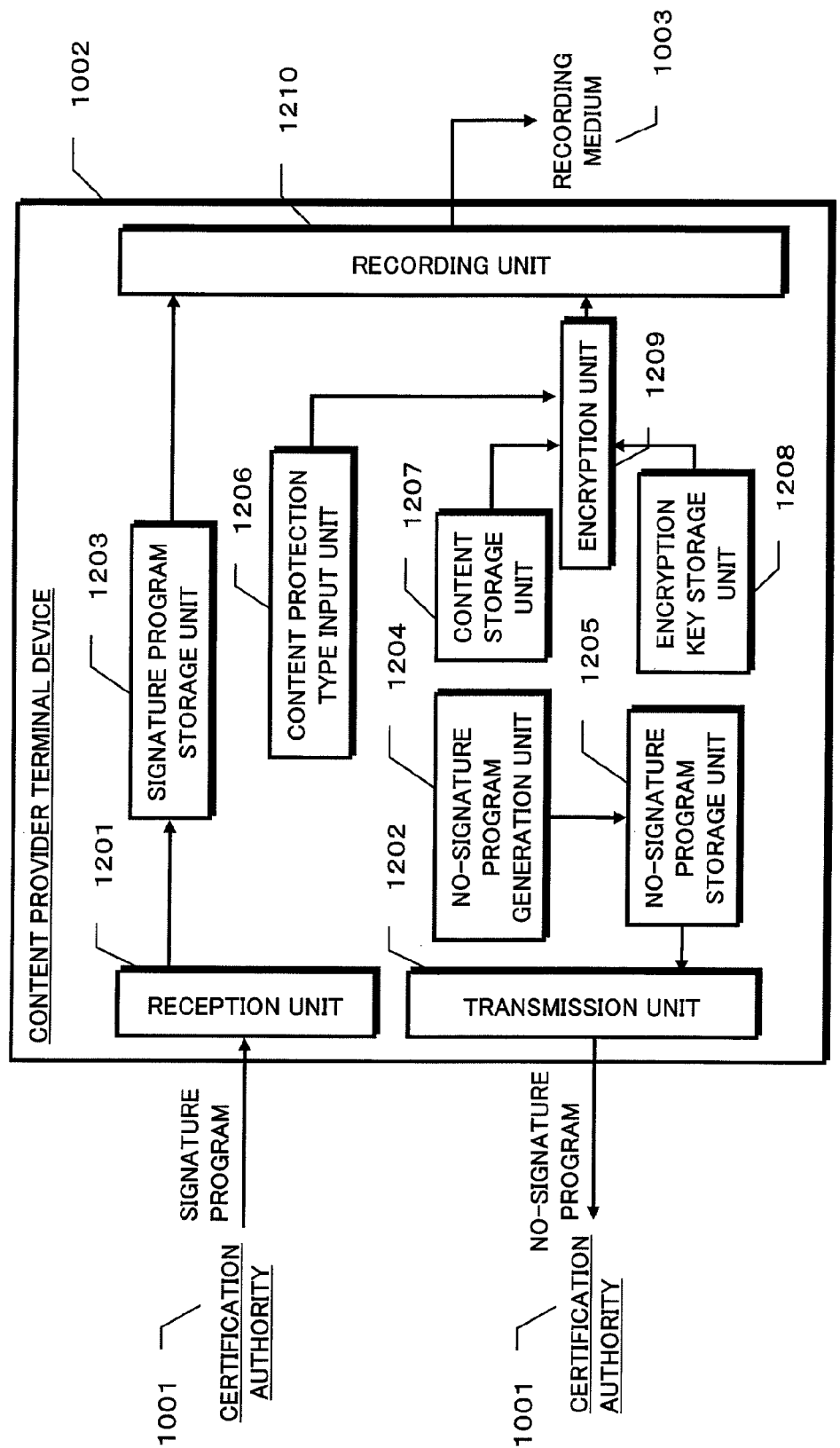
FIG. 12 is a block diagram showing a content provider terminal device according to the second embodiment.

The content provider terminal device 1002 includes, as shown in FIG. 12, a reception unit 1201, a transmission unit 1202, a signature program storage unit 1203, a no-signature program generation unit 1204, a no-signature program storage unit 1205, a content protection type input unit 1206, a content storage unit 1207, an encryption key storage unit 1208, an encryption unit 1209, and a recording unit 1210.

The content provider terminal device 1002 is specifically composed of a microprocessor, a RAM, a ROM, a hard disk, and the like, though not shown in the figure. A computer program is stored in the RAM, the ROM, and the hard disk. Functions of the content provider terminal device 1002 are achieved by the microprocessor operating in accordance with the computer program.

Note that each of the functional units of the content provider terminal device 1002, such as the reception unit 1201, the transmission unit 1202, the signature program storage unit 1203, the no-signature program generation unit 1204, the no-signature program storage unit 1205, the content protection type input unit 1206, the content storage unit 1207, the encryption key storage unit 1208, the encryption unit 1209, and the recording unit 1210, is typically realized as an LSI that is an integrated circuit. These functional units may be separately integrated into one chip, or integrated into one chip including part or all of the functional units.

Here, the LSI may be called an IC, a system LSI, a super LSI, and an ultra LSI, depending on the integration degree.

Also, a method of forming integrated circuits is not limited to LSIs, and may be realized using a dedicated circuit or a general-purpose processor. Furthermore, it is possible to form integrated circuits with use of an FPGA (Field Programmable Gate Array) programmable after manufacturing LSIs or a reconfigurable processor in which connection and setting of the circuit cell inside an LSI can be reconfigured.

Furthermore, when a new technology for forming integrated circuits that replaces LSIs becomes available as a result of progress in semiconductor technology or semiconductor-derived technologies, the functional units may be integrated using such technology. One possibility lies in adaptation of biotechnology.

Finally, the functional units may be realized with software, or by combining an LSI and software. Also, the software may be tamper-resistant.

(1) Reception Unit 1201

The reception unit 1201 receives a signature program from the certification authority terminal device 1001.

(2) Transmission Unit 1202

The transmission unit 1202 transmits a no-signature program stored in the no-signature program storage unit 1205 to the certification authority terminal device 1001.

(3) Signature Program Storage Unit 1203

The signature program storage unit 1203 receives, via the reception unit 1201, a signature program to which a signature has been attached by the certification authority terminal device 1001, and stores therein the received signature program.

(4) No-Signature Program Generation Unit 1204

The no-signature program generation unit 1204 generates a no-signature program, and stores the generated no-signature program in the no-signature program storage unit 1205.

(5) No-Signature Program Storage Unit 1205

The no-signature program storage unit 1205 stores therein a no-signature program generated by the no-signature program generation unit 1204. The stored no-signature program is transmitted to the certification authority terminal device 1001 via the transmission unit 1202.

(6) Content Protection Type Input Unit 1206

The content protection type input unit 1206 inputs a content protection type of a content via an operator. Note that the content provider terminal device 1002 may acquire a medium type of the recording medium 1003 to judge the content protection type, instead of input via the operator.

(7) Content Storage Unit 1207

The content storage unit 1207 stores therein a content to be recorded in the recording medium 1003.

(8) Encryption Key Storage Unit 1208

The encryption key storage unit 1208 stores therein an encryption key for encrypting a content to be recorded in the recording medium 1003.

(9) Encryption Unit 1209

The encryption unit 1209 encrypts a content stored in the content storage unit 1207 using an encryption key stored in the encryption key storage unit 1208. However, the structure of the encryption unit 1209 is not limited to this. Alternatively, the encryption unit 1209 may or may not encrypt a content, based on a content protection type input by the content protection type input unit 1206 for identifying an encryption status of a content, such as a status in which the content is encrypted or not. Specifically, if a content protection type "encryption protection" is input, the encryption unit 1209 encrypts the content. If a content protection type "anti-tampering" is input, the encryption unit 1209 generates data for detecting tampering for the content. If a content protection type "no-protection" is input, the encryption unit 1209 does not encrypt the content and not generate data for detecting tampering for the content.

(10) Recording Unit 1210

The recording unit 1210 records, in the recording medium 1003, a signature program stored in the signature program storage unit 1203 and a content on which processing is performed by the encryption unit 1209 based on the content protection type.

FIG. 13 shows an example of the recording medium 1003 in which the above data is recorded by the recording unit 1210. The signature program is recorded in the signature program storage region 1301, and the content is recorded in the content storage region 1302.

2.4 Structure of Playback Device 1004

Figure 14:
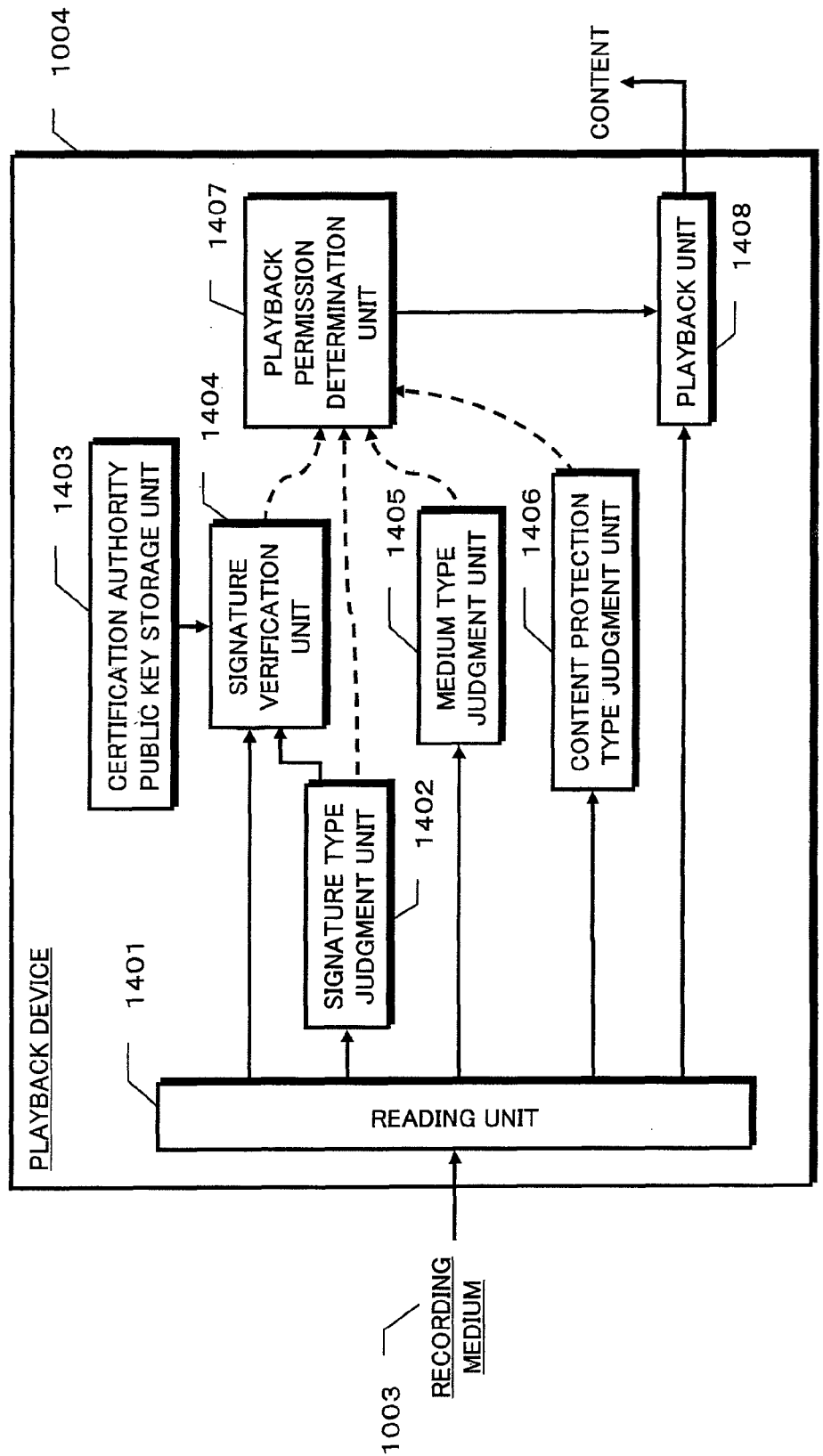
FIG. 14 shows the structure showing a playback device according to the second embodiment.

The playback device 1004 includes, as shown in FIG. 14, a reading unit 1401, a signature type judgment unit 1402, a certification authority public key storage unit 1403, a signature verification unit 1404, a medium type judgment unit 1405, a content protection type judgment unit 1406, a playback permission determination unit 1407, and a playback unit 1408.

The playback device 1004 is specifically composed of a microprocessor, a RAM, a ROM, a hard disk, and the like, though not shown in the figure. A computer program is stored in the RAM, the ROM, and the hard disk. Functions of the playback device 1004 are achieved by the microprocessor operating in accordance with the computer program.

Figure 19:
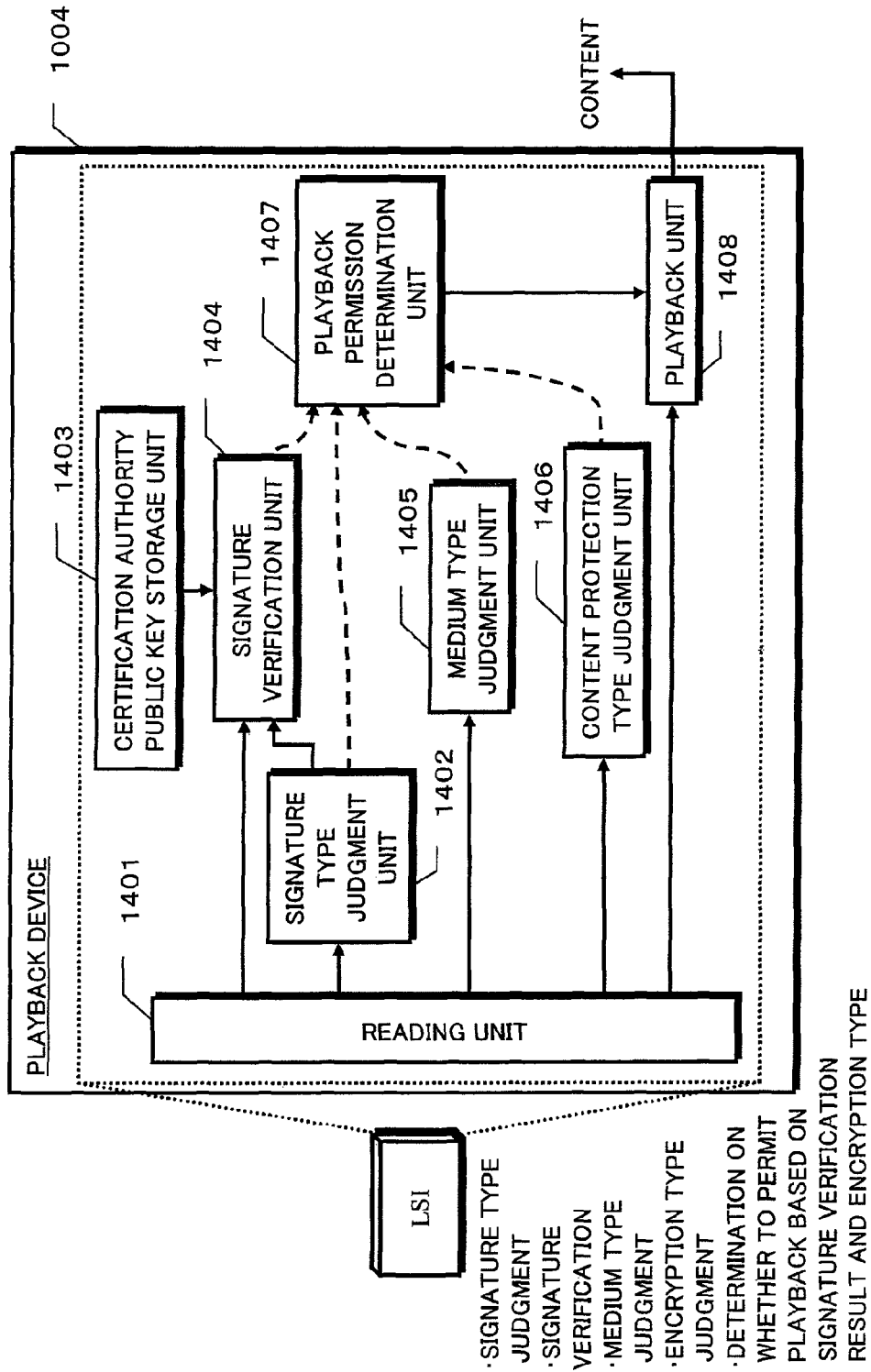
FIG. 19 shows the structure of an LSI that realizes the functions of the playback device according to the second embodiment.

Note that each of the functional units of the playback device 1004, such as the reading unit 1401, the signature type judgment unit 1402, the certification authority public key storage unit 1403, the signature verification unit 1404, the medium type judgment unit 1405, the content protection type judgment unit 1406, the playback permission determination unit 1407, and the playback unit 1408, is typically realized as an LSI that is an integrated circuit. These functional units may be separately integrated into one chip, or integrated into one chip including part or all of the functional units. FIG. 19 shows an example of the manufacture of the system LSI. In FIG. 19, the functional units surrounded by a dashed line are integrated into one chip as an LSI.

Here, the LSI may be called an IC, a system LSI, a super LSI, and an ultra LSI, depending on the integration degree.

Also, a method of forming integrated circuits is not limited to LSIs, and may be realized using a dedicated circuit or a general-purpose processor. Furthermore, it is possible to form integrated circuits with use of an FPGA (Field Programmable Gate Array) programmable after manufacturing LSIs or a reconfigurable processor in which connection and setting of the circuit cell inside an LSI can be reconfigured.

Furthermore, when a new technology for forming integrated circuits that replaces LSIs becomes available as a result of progress in semiconductor technology or semiconductor-derived technologies, the functional units may be integrated using such technology. One possibility lies in adaptation of biotechnology.

Finally, the functional units may be realized with software, or by combining an LSI and software. Also, the software may be tamper-resistant.

(1) Reading Unit 1401

The reading unit 1401 reads a signature program, a content, and medium type information from the recording medium 1003, and transmits the read signature program to the signature type judgment unit 1402, and transmits the read medium type information to the medium type judgment unit 1405.

(2) Signature Type Judgment Unit 1402

The signature type judgment unit 1402 reads signature type information stored in the signature type storage region 1311 of the header part 1310 of the signature program received by the reading unit 1401, and specifies a signature type. Then, the signature type judgment unit 1402 transmits a result of the specification to the signature verification unit 1404 and the playback permission determination unit 1407.

Here, the signature type indicates a type of a signature such as the test release type and the official release type. Regarding an identifier corresponding to a signature type, the test release type corresponds to an identifier T "0x01", and the official release type corresponds to an identifier C "0x10".

(3) Certification Authority Public Key Storage Unit 1403

The certification authority public key storage unit 1403 stores therein a public key corresponding to a secret key stored in the certification authority terminal device 1001. The certification authority public key is used for verifying a signature attached by the certification authority terminal device 1001.

(4) Signature Verification Unit 1404

The signature verification unit 1404 receives signature type information judged by the signature type judgment unit 1402, and verifies a signature stored in the signature data part 1330 of a signature program received by the reading unit 1401 based on a specified signature type of the signature. The signature verification unit 1404 judges whether the program is an authentic program based on a result of the verification. Also, it is possible to check the completeness of the program by performing signature verification (for example, it is possible to check whether signature type information stored in the signature type storage region 1311 is not tampered with). The signature verification unit 1404 transmits verification result information showing the result of the signature verification to the playback permission determination unit 1407.

(5) Medium Type Judgment Unit 1405

The medium type judgment unit 1405 specifies a medium type of a recording medium based on medium type information received by the reading unit 1401, and transmits the specified medium type to the playback permission determination unit 1407.

Here, the medium type indicates a medium type of recording medium, such as a ROM (Read Only Memory), an R (Recordable), and an RW (ReWritable). Since the medium type can be identified with use of a known method such as an identification method that uses an identifier (ID) recorded on a recording medium, the description thereof is omitted here. In the following descriptions, identifiers "0x001", "0x010", and "0x100" are respectively recorded in the ROM, the R, and the RW, as an example.

(6) Content Protection Type Judgment Unit 1406

The content protection type judgment unit 1406 analyzes the content read by the reading unit 1401, and specifies a content protection type of the content identifying, for example, a status in which whether the content is encrypted, and transmits the specified content protection type to the playback permission determination unit 1407.

Here, the content protection type indicates a type of a status of a content, such as a status in which a content has data for detecting tampering, a status in which the content has been encrypted, and a status in which the content has not been encrypted. Since the content protection type can be identified with use of a known method such as a method of checking data of the content (specifically, analyzing values of a CPI (COPY PERMISSION INDICATOR)) and a method of making identification based on whether logical data is stored (specifically, checking whether a specific directory (example:

AACS directory) stored on a disc indicating that the content is protected by encryption. Accordingly, the description thereof is omitted here. As an example, in the case where a content is protected by encryption, an identifier E "0x10" is recorded. In the case where a content is not protected, an identifier F "0x01" is recorded.

(7) Playback Permission Determination Unit 1407

Based on verification result information showing a result of verification performed by the signature verification unit 1404, a signature type specified by the signature type judgment unit 1402, a medium type specified by the medium type judgment unit 1405, and a content protection type specified by the content protection type judgment unit 1406, the playback permission determination unit 1407 determines whether to permit playback of a content using the signature program.

Note that the playback permission determination unit 1407 may determine whether to permit playback of the content, based on a combination of the verification result information showing the result of the verification performed by the signature verification unit 1404, the signature type specified by the signature type judgment unit 1402, the medium type specified by the medium type judgment unit 1405, and the content protection type specified by the content protection type judgment unit 1406, or based on part of these pieces of information.

Specifically, if the signature verification is unsuccessful, the playback permission determination unit 1407 determines to stop playing back the content, or determines to playback the content without executing the signature program. On the other hand, the playback permission determination unit 1407 may determine whether to permit playback of the content based on a combination of a signature type specified by the signature type judgment unit 1402, a medium type specified by the medium type judgment unit 1405, and a content protection type specified by the content protection type judgment unit 1406, irrespective of a result of signature verification. Specifically, if the signature type, the medium type, and the content protection type are respectively specified as T (0x01), R (0x010), and F (0x001), the playback permission determination unit 1407 permits playback of the content. If the signature type, the medium type, and the content protection type are respectively specified as C (0x10), R (0x010), and F (0x001), the playback permission determination unit 1407 prohibits playback of the content. This is because the combination of R and test release type indicates that the recording medium is an R medium manufactured for test purpose in the manufacturing process of a ROM medium, and the combination of R and official release type indicates that the recording medium is an R medium manufactured by copying a ROM medium in an unauthorized manner.

(8) Playback Unit 1408

If the playback permission determination unit 1407 determines to permit playback of a content, the playback unit 1408 executes a signature program read from the recording medium 1003, in an execution environment thereof. Then, the playback unit 1408 descrambles the content that has been scrambled (data that has been modified) based on secret information calculated using the program, so as to play back the content. On the other hand, if the playback permission determination unit 1407 determines to prohibit playback of the content, the playback unit 1408 may not execute the signature program read from the recording medium 1003 and may not play back the content. Alternatively, the playback unit 1408 may playback the content without executing the signature program read from the recording medium 1003.

2.5 Operations of Certification Authority Terminal Device 1001

The following describes the operations of the certification authority terminal device 1001.

The certification authority public key/secret key generation unit 1106 of the certification authority terminal device 1001 generates a pair of a certification authority public key and a certification authority secret key, and stores the generated pair of the keys in the certification authority public key/secret key storage unit 1105. For convenience of the copyright protection data processing system, only one pair of a certification authority public key and a certification authority secret key is necessary. Accordingly, once one pair of keys is generated, it is unnecessary to generate another one pair of keys unless the certification authority public key/secret key storage unit is damaged and cannot be restored, or the certification authority secret key is leaked.

Figure 15:
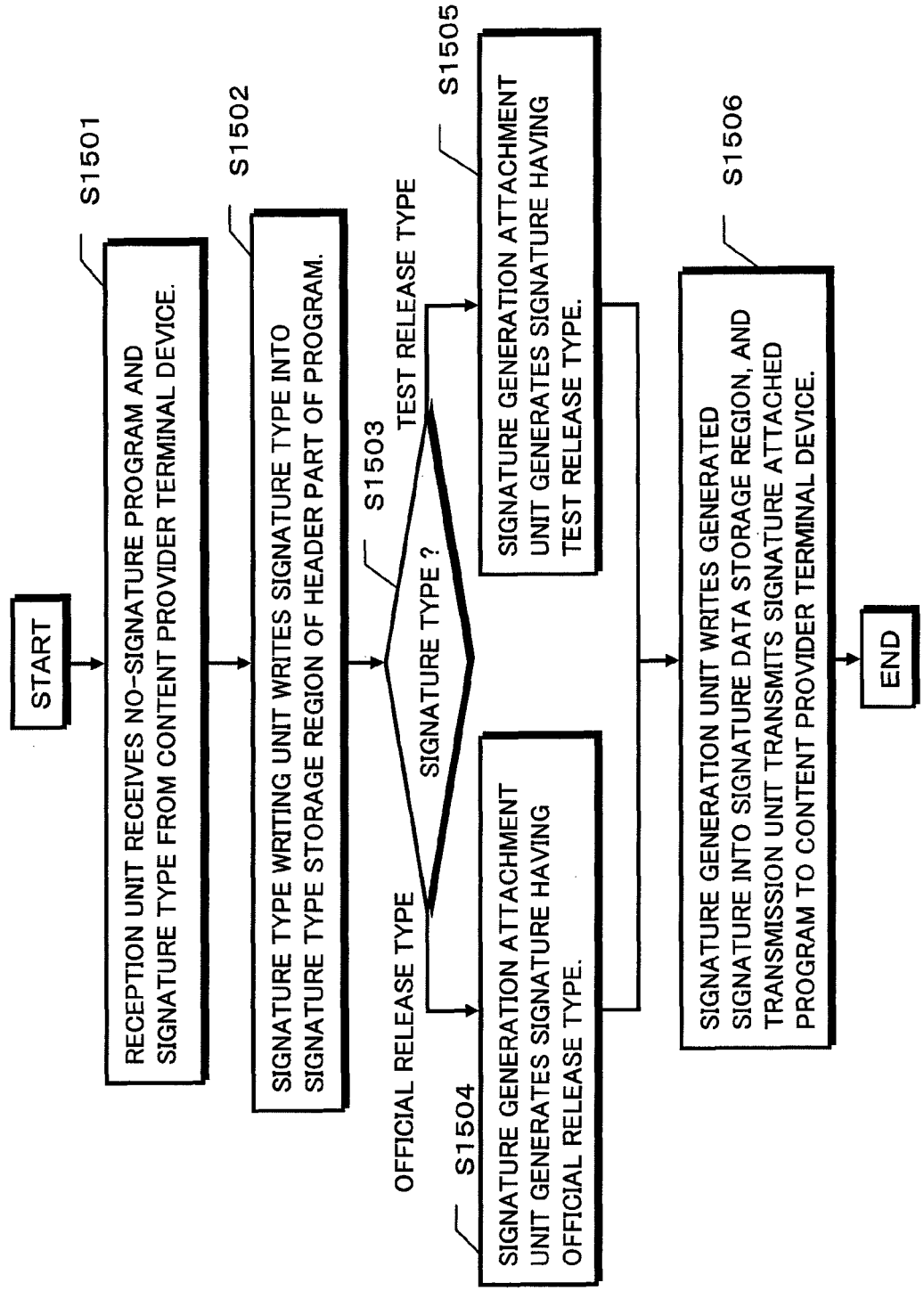
FIG. 15 shows the operations of the certification terminal device according to the second embodiment.

The following describes a flow of attaching a signature to a program, with reference to FIG. 15.

The reception unit 1101 of the certification authority terminal device 1001 receives, from the content provider terminal device 1002, a program necessary for playing back a content, and a request for signature type of a signature to be attached to the program (test release type or official release type) (Step S1501). Based on the request for the signature type of the signature to be attached, which has been received from the reception unit 1101, the signature type writing unit 1103 writes signature type information into the signature type storage region 1311 included in the header part 1310 of the received program ("0x01" in case of test release type and "0x10" in case of official release type) (Step S1502).

If the signature type information indicates the official release type (Step S1503: official release type), the signature generation attachment unit 1104 generates a signature having the official release type (Step S1504). If the signature type information indicates the test release type (Step S1503: test release type), the signature generation attachment unit 1104 generates a signature having the test release type (Step S1505). For example, the signature generation attachment unit 1104 generates a signature having the official release type for a hash value of the entire header part 1310 and instruction code part 1320 of the signature program. On the other hand, the signature generation attachment unit 1104 calculates a hash value of the entire header part 1310 of and instruction code part 1320 of the signature program, and generates a signature for the hash value on which bit-inversion is performed. In this example, since it is possible to generate a signature having the official release type and a signature having the test release type with use of the same value, no special data is necessary for generating signatures for each signature type. Note that a procedure of generating and attaching a signature is not necessarily limited to the procedure described above. Alternatively, a procedure of generating and attaching a signature and a target to which the signature is to be attached may be different from those described above.

The signature generation attachment unit 1104 writes the generated signature into the signature data storage region 1330 included in the signature data part 1330 of the program. The transmission unit 1102 transmits, to the content provider terminal device 1002, a signature program to which the signature is attached by the signature generation attachment unit 1104 (Step S1506).

2.6 Operations of Content Provider Terminal Device 1002

Figure 16:
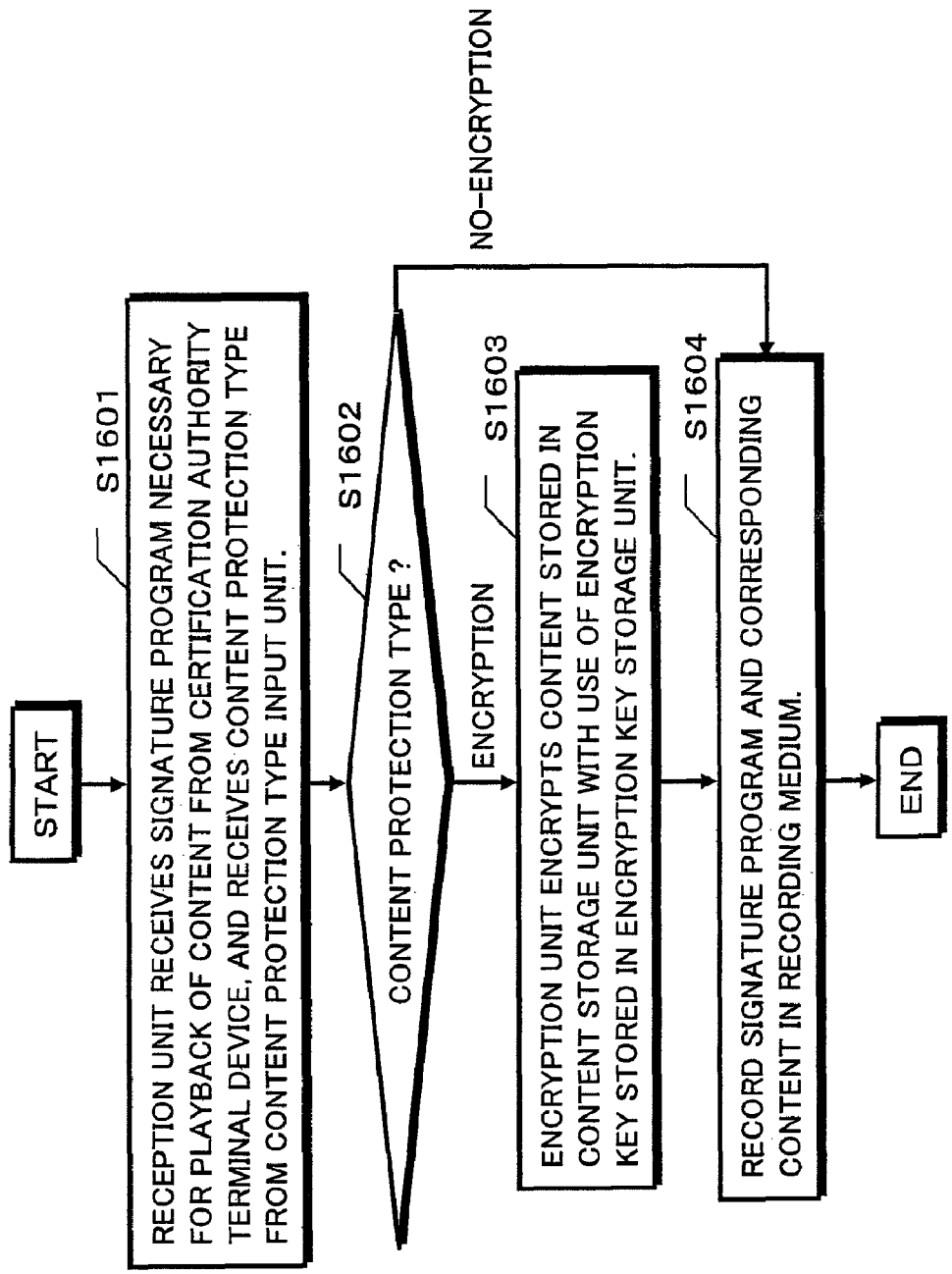
FIG. 16 shows the operations of the content provider terminal device according to the second embodiment.

The following describes the operations of the content provider terminal device 1002, with reference to FIG. 16.

The no-signature program generation unit 1204 generates a no-signature program, and stores the generated no-signature program in the no-signature program storage unit 1205. The generated no-signature program is transmitted to the certification authority terminal device 1001 via the transmission unit 1202. The signature program storage unit 1203 receives, via the reception unit 1201, a signature program to which a signature has been attached. The content protection type input unit 1206 receives input of a content protection type (Step S1601). If the received content protection type is "encryption protection" (Step S1602: encryption), the encryption unit 1209 encrypts a content stored in the content storage unit 1207 with use of an encryption key stored in the encryption key storage unit 1208 (Step S1603). If the received content protection type is "no-protection" (Step S1602: no-encryption), the flow proceeds to Step S1604. The encryption unit 1209 records the signature program, and an encrypted content or an unencrypted content in the recording medium 1003 (Step S1604).

2.7 Operations of Playback Device 1004

Figure 17:
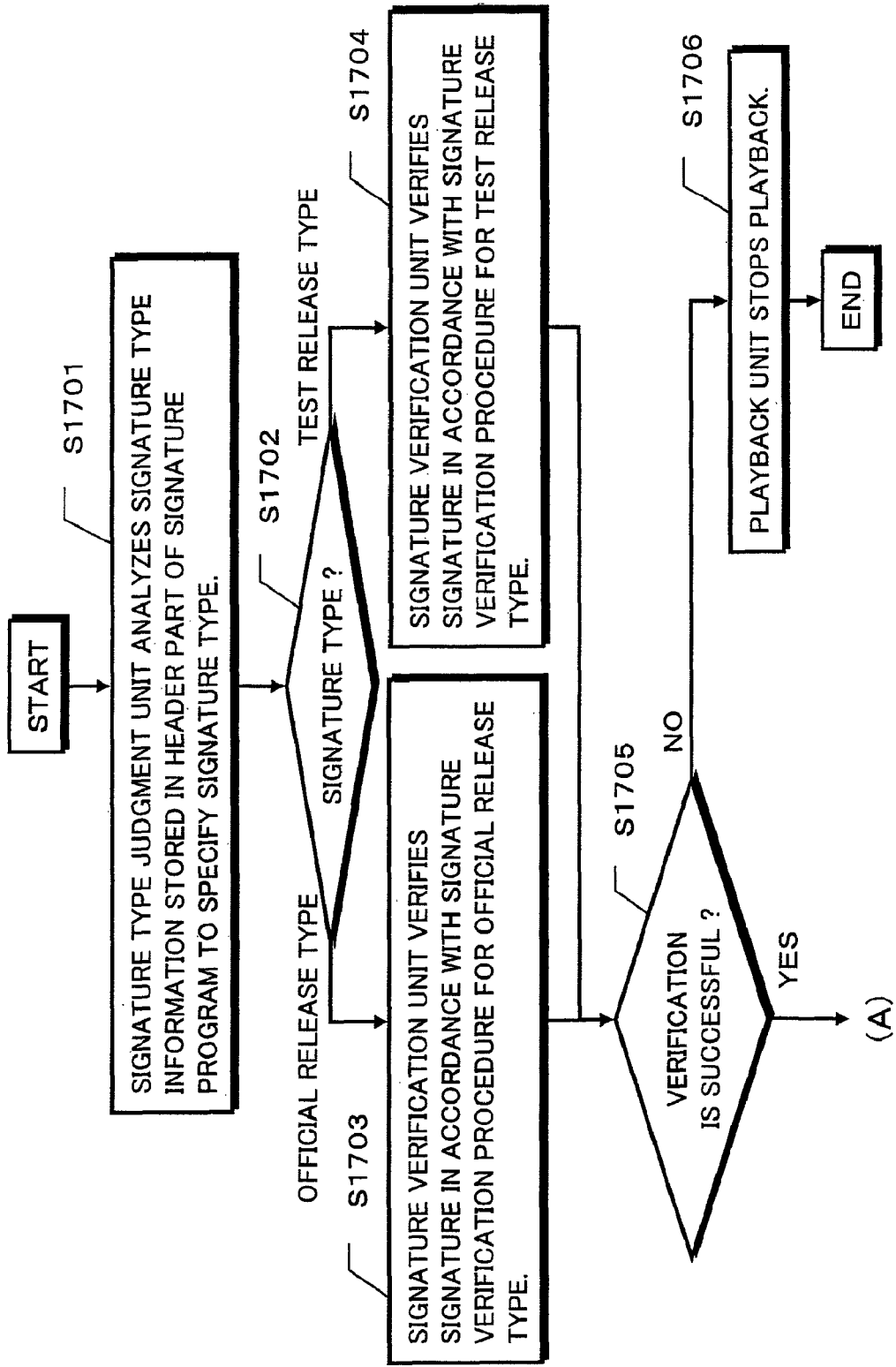
FIG. 17 shows the operations of the playback device according to the second embodiment.
Figure 18:
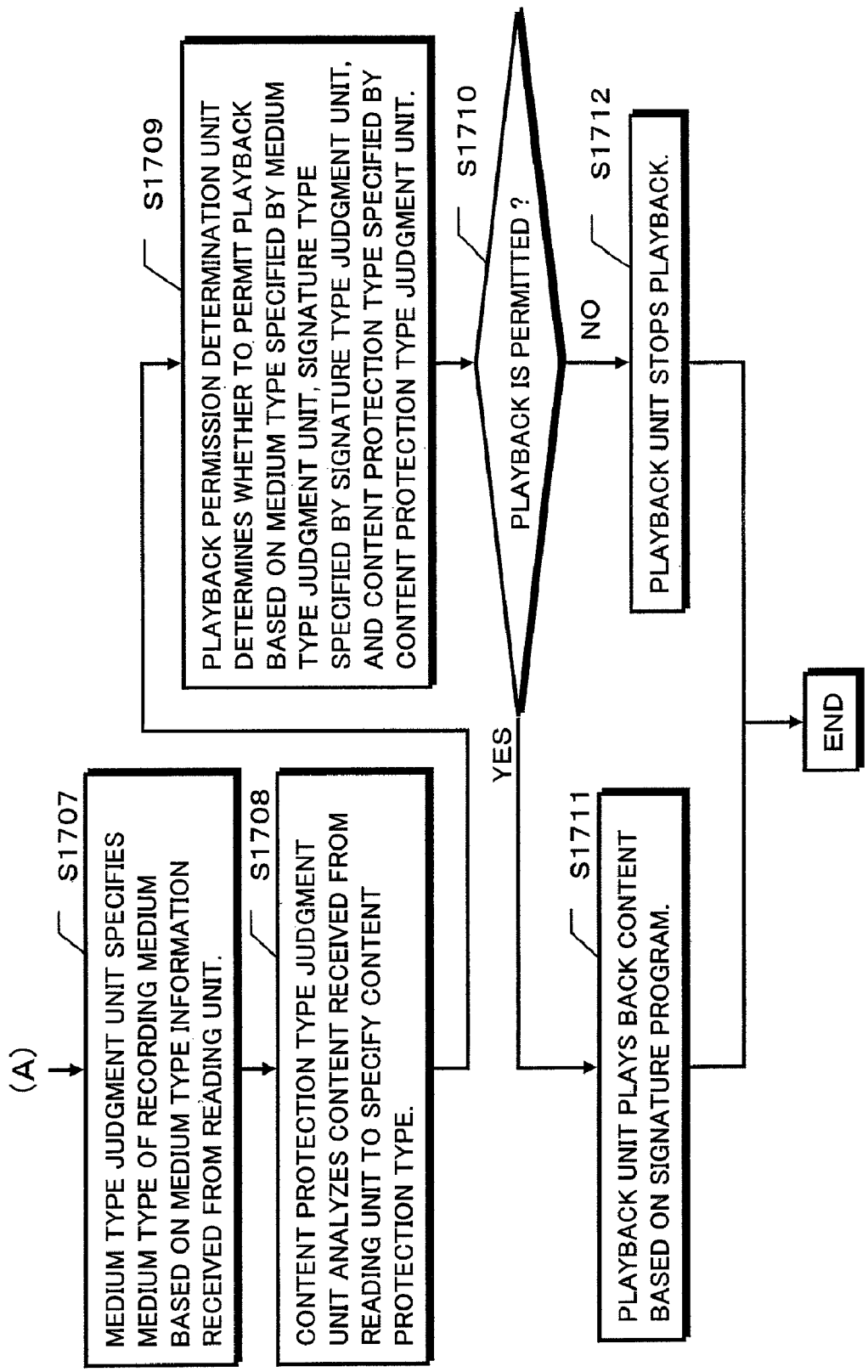
FIG. 18 shows the operations of the playback device according to the second embodiment.

The following describes the operations of the playback device 1004, with reference to FIG. 17 and FIG. 18.

The reading unit 1401 of the playback device 1004 reads a content, a signature program necessary for playing back the content, and medium type information from the recording medium 1003. Also, the signature type judgment unit 1402 reads signature type information (test release type or official release type) stored in the signature type storage region 1311 included in the header part 1310 of the signature program received from the reading unit 1401. Then, the signature type judgment unit 1402 specifies a signature type of a signature attached to the received program (for example, test release type T (0x01) or official release type C (0x10)), and transmits the specified signature type to the signature verification unit 1404 and the playback permission determination unit 1407 (Step S1701).

If the signature type information indicates the official release type (Step S1702: official release type), the signature verification unit 1404 verifies the signature using a signature verification procedure for official release type (Step S1703). If the signature type information indicates the test release type (Step S1702: test release type), the signature verification unit verifies the signature using a signature verification procedure for test release type (Step S1704). For example, according to the signature verification procedure for official release type, signature verification is performed using a hash value for the entire header part 1310 and instruction code part 1320 of the signature program and a value written into the signature data storage region of the header part 1310 of the signature program. On the other hand, according to the signature verification procedure for test release type, signature verification is performed using a hash value for the entire header part 1310 and instruction code part 1320 of the signature program, on which bit-inversion is performed, and a value written into the signature data storage region of the header part 1310 of the signature program.

If the signature verification is unsuccessful (Step S1705: NO), the signature verification unit 1404 transmits a result of the signature verification to the playback unit 1408. Then, the playback unit 1408 stops playing back the content (S1706).

If the signature verification is successful (Step S1705: YES), the medium type judgment unit 1405 specifies a medium type (for example, ROM, R, or RW) based on the medium type information received from the input unit 1401, and transmits the specified medium type to the playback permission determination unit 1407 (Step S1707).

The content protection type judgment unit 1406 specifies a content protection type (for example, encryption protection "E" or no-protection "F") based on the content received from the input unit 1401, and transmits the specified content protection type to the playback permission determination unit 1407 (Step S1708).

Based on the medium type received from the medium type judgment unit 1405, the signature type received from the signature type judgment unit 1402, and the content protection type received from the content protection type judgment unit 1406, the playback permission determination unit 1407 determines whether to permit playback of the received content (Step S1709). If the playback permission determination unit 1407 determines to permit playback of the content (Step 1710: YES), the playback unit 1408 executes the signature program read from the recording medium 1003 in an execution environment thereof, and descrambles the content that has been scrambled (data that has been modified) based on secret information calculated using the signature program, so as to playback the content (Step S1711). Also, if determining to prohibit playback of the content (Step 1710: NO), the playback permission determination unit 1407 transmits a result of the playback permission determination to the playback unit 1408, and the playback unit 1408 stops playing back the content (Step S1712).

Modification Examples

While the present invention has been described based on the above embodiments, the present invention is of course not limited to the above embodiments. The present invention also includes the following cases.

(1) In the above embodiments, a signature having official release type is a signature generated for a hash value of the entire header part and instruction code part of a signature program. Also, a signature having the test release type is a signature generated for a hash value of the entire header part and instruction code part of a signature program, on which bit-inversion is performed. However, the present invention is not limited to this structure. Alternatively, it is enough that a difference lies between the signature generation procedure for official release type and the signature generation procedure for test release type. The following describes a signature generation procedure for official release type and a signature generation procedure for test release type in the case where the signature generation procedure for test release type does not include performance of bit-inversion on a hash value for a program to which a signature is to be attached.

(1-1) In the above embodiments, although the signature generation procedure for test release type includes performance of bit-inversion, it may be possible to modify a value in another invertible manner. For example, in the case of the test release type, it may be possible to generate a signature for a result obtained by replacing between a one higher byte and a one lower byte, for a result obtained by performing an XOR operation using the hash value and a fixed value.

(1-2) It may be possible to appropriately switch between pairs of keys for generating a signature. For example, the signature generation device may store therein both a pair of public keys for generating a signature having the test release type and a pair of public keys for generating a signature having the official release type, and may properly use a key for generating a signature based on a request for signature type, instead of writing the signature type into a header part of a signature program.

(1-3) It may be possible to store different information in a header part of a signature program depending on whether a signature has the test release type or the official release type. For example, if the header part of the signature program includes a size field defining a size of an instruction code part, it may be possible to modify a value in the size field. In this case, a signature having the official release type is a signature generated for a hash value of the entire header part and instruction code part of the signature program. A signature having the test release type is a signature generated for a value, which is obtained by calculating a hash value for the entire data and entire instruction code part, and performing bit-inversion on the calculated hash value. The data is the size field included in the header part of the signature program that has been converted into a fixed value (for example, data embedded with a value "0").

(1-4) It may be possible to switch a program to which a signature is to be attached, based on whether the signature has the test release type or the official release type. For example, it may be possible to generate a signature having the official release type for a hash value of the entire header part and instruction code part of a signature program. It may be possible to generate a signature having the test release type for a hash value of the entire instruction code part of a signature program.

(1-5) A signature having the official release type may be generated for a hash value of the entire header part and instruction code part of a signature program. A signature having the test release type may be generated for a hash value for the entire header part and instruction code part of a signature program to which a constant value is added (for example, a character "TEST" is inserted at the head). Note that a signature to be generated by adding the constant value and calculating a hash value may be not a signature having the test release type, but a signature having the official release type. Alternatively, it may be possible to generate both a signature having the test release type and a signature having the official release type by adding a different constant value, and then calculating a hash value. Note that the constant value may be inserted into a various portion, such as the head of the header part, the end of the instruction code part, a portion between the header part and the instruction code part, and a portion within the instruction code part.

(1-6) It may be possible to perform bit-inversion, and then calculate a hash value. For example, a signature having the official release type may be generated for a hash value of the entire header part and instruction code part of a signature program. Also, a signature having the test release type may be generated for a hash value of data that is obtained by performing bit-inversion on the entire header part and instruction code part of a signature program. Note that a portion on which bit-inversion to be performed is not limited to all the portions of the header part and the instruction code part of the signature program. Bit-inversion may be performed on only the header part or only the instruction code part of the signature program.

(1-7) It may be possible to calculate a signature and then perform bit-inversion. For example, a signature having the official release type may be generated for a hash value of the entire header part and instruction code part of a signature program. Also, a signature having the test release type may be generated by calculating a hash value of the entire header part and instruction code part of a signature program and inverting bits of the signature.

(2) In the above embodiment, the two signature types are used, namely the test release type and the official release type. The present invention is not limited to this structure. Alternatively, it may be employ two or more types, such as a test release type for ROM media, a test release type for R media, an official release type for ROM media, and downloaded content type, instead of the test release type and the official release type. Similarly, the medium type is not limited to the three types, namely the ROM, the R, and the RW. Furthermore, the present invention is not limited to the structure in which a judgment on whether test release type or official release type is made based on a signature type of a signature attached to a program. Alternatively, it may be possible to employ the structure, for example, in which a signature is attached not to a program but to a content, and the judgment is made based on a signature type of the signature attached to the content. Further alternatively, the judgment may be made based on information recorded in the recording medium independently from the content and the program. In other words, as long as information that enables appropriate judgment on whether test release type or official release type is recorded in the recording medium, the information does not necessarily need to be in a form of signature type.

(3) In the above embodiment, a content recorded in a recording medium is protected by a program recorded in the same recording medium. The present invention is not limited to this structure. Alternatively, the following structure may be employed. For example, in addition to protection of the content by a program (for example, with use of secret information calculated by operations of the program, the content is scrambled or values of data are partially modified), the content is further protected by being encrypted. Further alternatively, the content may be protected using two or more copyright protection techniques. In this case, the recording permission determination unit of the recording device and the playback permission determination unit of the playback device may respectively determine whether to permit recording and playback of the content, based on whether the content is encrypted using a second copyright protection technique or whether the content has a signature attached thereto using the second copyright protection technique, in addition to the medium type and the signature type. For example, if the medium type and the signature type are respectively specified as R and official release and the content is encrypted using the second copyright protection technique or the content has a signature attached thereto using the second copyright protection technique, the recording permission determination unit and the playback permission determination unit respectively may permit recording and playback of the content. Also, if the medium type and the signature type are respectively specified as R and official release, and the content is not encrypted using the second copyright protection technique, and the content does not have a signature attached thereto using the second copyright protection technique, the recording permission determination unit and the playback permission determination unit respectively may prohibit recording and playback of the content.

(4) In the above embodiment, the recording device determines whether to permit recording of a content based on both a medium type and a signature type. The present invention is not limited to this structure. Alternatively, whether to permit recording may be determined based on one of the medium type and the signature type. Further alternatively, the following system may be employed. For example, the recording device records the content without making a determination on whether to permit recording of the content, and then the playback device determines whether to permit playback of the content. Further alternatively, after verifying a signature attached to the program, the recording device may determine whether to permit recording of the content by specifying a signature type of the attached signature.

(5) In the above embodiment, after verifying a signature, the playback device specifies a signature type of the signature. The present invention is not limited to this structure. Alternatively, the following structure may be employed, for example: after specifying the signature type, the playback device verifies the signature. Further alternatively, in the structure in which keys for generating signatures differ between signature types, the playback device may verify the signature using a key corresponding to the specified signature type. The same also applies to the case of recording by the recording device.

(6) In the above embodiment, the playback device determines whether to permit playback of a content based on a medium type and a signature type. The present invention is not limited to this structure. Alternatively, the following structure may be employed. For example, if the medium type is judged to be a ROM, the playback device verifies a signature. If the program is judged to be an authentic program as a result of the verification, the playback device permits playback of the content, regardless of which signature type the signature has. On the other hand, if the medium type is judged to be a medium other than a ROM, the playback device determines whether to permit playback of the content with reference to the signature type. In this way, the step of referring to the signature type may be skipped depending on the judged medium type. Furthermore, the step of referring to the medium type may be skipped depending on the specified signature type, conversely. Moreover, if an encryption method or a signature method according to the second copyright protection technique is used for protecting a content, the step of referring to the medium type or the step of referring to the signature type may be skipped depending on whether the content is protected using the second copyright protection technique. The same also applies to the case of recording by the recording device.

(7) In the above embodiment, the recording device records a content and a program in a recording medium, and transmits the recorded content and program to the playback device. The present invention is not limited to this structure. Alternatively, for example, only the content may be recorded in the recording medium, and the program may be transmitted to the playback device via a network. Further alternatively, only the program may be recorded in the recording medium, and the content may be transmitted to the playback device via a network, on the contrary. Further alternatively, both the content and the program may be transmitted to the playback device via a network without being recorded in the recording medium. In this case, judgment on whether to permit playback of the content is made based on the signature type and whether the content is protected (the content is encrypted or has a signature attached thereto) using the second copyright protection technique.

(8) The recording device according to the above embodiment may include an instruction reception unit operable to receive one of an instruction to encrypt a content or an instruction to generate a signature for the content and attach the generated signature to the content or receive a signature for the content and attach the received signature to the content. The recording device may determine whether to permit recording of the content, based on the above received instruction in addition to the medium type and the signature type.

(9) All or part of the functional units of each of the above devices may be composed of a removable IC card or a single module. The IC card or the single module is a computer system composed of a microprocessor, a ROM, a RAM, and the like. The IC card or the module may include a super-multifunctional LSI. Functions of the IC card or the module are achieved by the microprocessor operating in accordance with the computer program. The IC card or the module may be tamper-resistant.

(10) The present invention may be the above methods. Also, the present invention may be a computer program that realizes the methods by a computer, or a digital signal composed of the computer program.

Furthermore, the present invention may be a computer-readable storage medium such as a flexible disk, a hard disk, a CD-ROM, an MO, a DVD, a DVD-ROM, a DVD-RAM, a BD (Blu-ray Disc), and a semiconductor memory, which stores the computer program or the digital signal. Furthermore, the present invention may be the computer program or the digital signal stored on the storage medium.

Furthermore, the present invention may be the computer program or the digital signal transmitted via an electric communication network, a wireless or wired communication network, a network such as Internet, data broadcasting, and the like.

Furthermore, the present invention may be a computer system that includes a microprocessor and a memory, and the microprocessor may operate in accordance with the computer program, and the memory may store therein the computer program.

Furthermore, the program or the digital signal may be executed by another independent computer system, by transferring the program or the digital signal to the recording medium, or by transferring the program or the digital signal via a network or the like.

(11) The present invention also includes the following cases.

The present invention provides a playback device for playing back a digital content, the playback device comprising: a reading unit operable to receive the digital content, a program necessary for playing back the digital content, and a medium type of a recording medium in which the digital content and the program necessary are recorded; a signature type judgment unit operable to judge a signature type of a signature attached to the program; a medium type judgment unit operable to judge the medium type of the recording medium; and a playback permission determination unit operable to determine whether to permit playback of the content, based on results of the judgments made by the signature type judgment unit and the medium type judgment unit.

The present invention provides the playback device, further comprising a signature verification unit operable to verify the signature attached to the program, wherein if a result of the verification performed by the signature verification unit is unsuccessful, the content is not played back.

The present invention provides the playback device, wherein the signature verification unit switch verification contents, based on the signature type judged by the signature type judgment unit.

The present invention provides the playback device, wherein if the signature type judged by the signature type judgment unit is an official release type, the signature verification unit performs a hash operation on the entire header part and instruction code part of the program, and verifies the signature using a value obtained as a result of the hash operation and signature data described in a signature data part of the program, and if the signature type judged by the signature type judgment unit is a test release type, the signature verification unit performs a hash operation on the entire header part and signature data part of the program, and verifies the signature using a correction value, which is obtained by performing bit-inversion on a value obtained as a result of the hash operation, and the signature data described in the signature data part of the program.

The present invention provides the playback device, wherein if the signature type judged by the signature type judgment unit is the official release type, the signature verification unit performs a hash operation on the entire header part and instruction code part of the program, and verifies the signature using a value obtained as a result of the hash operation and signature data described in the signature data part of the program, and if the signature type judged by the signature type judgment unit is the test release type, the signature verification unit performs a hash operation on a combination of the data part of the program and data that is the instruction code size field of the header part of the program overwritten with a fixed value, and performs signature verification on a value obtained as a result of the hash operation.

The present invention provides the playback device, further comprising an encryption judgment unit operable to judge whether the content is encrypted, wherein the playback permission determination unit determines whether to permit playback of the content, based on a result of the judgment made by the encryption judgment unit and one of the results of the judgments made by the signature type judgment unit and the medium type judgment unit.

The present invention provides the playback device, wherein the playback permission determination unit determines whether to permit playback of the content, based on the results of the judgments made by the signature type judgment unit, the medium type judgment unit, and the encryption judgment unit.

The present invention provides a content provider terminal device for recording a digital content, the content provider terminal device comprising: a no-signature program generation unit operable to generate a program necessary for playing back the digital content; a no-signature program storage unit operable to store therein the program generated by the no-signature program generation unit; a transmission unit operable to transmit the program stored in the no-signature program storage unit; a reception unit operable to receive a signature program that is the program transmitted by the transmission unit and to which a signature is attached; a signature program storage unit operable to store therein the signature program received by the reception unit; and a recording unit operable to record the signature program stored in the signature program storage unit in a signature program storage region of a recording medium.

The present invention provides the content provider terminal device, wherein the transmission unit transmits a signature type of the signature together with the program to which no signature is attached.

The present invention provides the content provider terminal device, comprising: a content storage unit operable to store therein the digital content to be recorded in the recording medium; an encryption key storage unit operable to store therein an encryption key for encrypting the digital content to be recorded in the recording medium; and an encryption unit operable to encrypt the digital content stored in the content storage unit using the encryption key stored in the encryption key storage unit.

The present invention provides the content provider terminal device, comprising a content protection type input unit operable to input a protection type indicating a protection status of the content, wherein the encryption unit determines whether to encrypt the content based on the protection type input by the content protection type input unit.

The present invention provides the content provider terminal device, wherein if the protection type of the content input by the content protection type input unit is the encryption type, the encryption unit encrypts the content using the encryption key, and if the protection type is the no-encryption type, the encryption unit does not encrypt the content.

The present invention provides a certification authority terminal device for attaching a signature to a no-signature program having no signature attached thereto, the certification authority terminal device comprising: a certification authority public key/secret key generation unit operable to generate a pair of a certification authority public key and a certification authority secret key to be used for generating a signature for the program and verifying the signature; a certification authority public key/secret key storage unit operable to store therein the pair of the certification authority public key and the certification authority secret key generated by the certification authority public key/secret key generation unit; a reception unit operable to receive the no-signature program from the content provider terminal device; a signature generation attachment unit operable to attach a signature to the no-signature program received by the reception unit; and a transmission unit operable to transmit the program to which the signature has been attached by the signature generation attachment unit.

The present invention provides the certification authority terminal device, further comprising a signature type writing unit operable to write a signature type of the signature received by the reception unit into a header part of the no-signature program received by the reception unit.

The present invention provides the certification authority terminal device, wherein the signature generation attachment unit switches a signature generation method for generating a signature based on the signature type received by the reception unit.

The present invention provides the certification authority terminal device, wherein if the signature type received by the reception unit is the official release type, the signature generation attachment unit performs hash operation for the entire header part and instruction code part of the no-signature program, and generates a signature for a value obtained as a result of the hash operation, and if the signature type received by the reception unit is the test release type, the signature generation attachment unit performs hash operation for the entire header part and instruction code part of the no-signature program, performs bit-inversion on a value obtained as a result of the hash operation to obtain a correction value, and generates a signature for the obtained correction value.

The present invention provides the certification authority terminal device, wherein if the signature type received by the reception unit is the official release type, the signature generation attachment unit performs hash operation for the entire header part and instruction code part of the no-signature program, and generates a signature for a value obtained as a result of the hash operation, and if the signature type is the test release type, the signature generation attachment unit performs hash operation for data generated by a combination of data generated by overwriting the size field of the instruction code part of the header part of the no-signature program with a fixed value and the instruction code part of the no-signature program, and generates a signature for a value obtained as a result of the hash operation.

The present invention provides a recording medium for recording therein a digital content and a program to which a signature is attached by a content provider terminal device, wherein the program to which the signature is attached includes a region for storing therein a signature type of the signature.

The present invention provides a copyright protection data processing system composed of a certification authority terminal device for generating a signature for a program necessary for playing back a digital content and attaching the generated signature to the program, a content provider terminal device for recording the digital content and the program in a recording medium, and a playback device for playing back the digital content, wherein the certification authority terminal device comprises: a certification authority public key/secret key generation unit operable to generate a pair of a certification authority public key and a certification authority secret key to be used for generating the signature for the program and verifying the signature; a certification authority public key/secret key storage unit operable to store therein the pair of the certification authority public key and the certification authority secret key generated by the certification authority public key/secret key generation unit; a reception unit operable to receive a no-signature program to which no signature is attached from the content provider terminal device; a signature generation attachment unit operable to attach a signature to the no-signature program received by the reception unit; and a transmission unit operable to transmit a signature program to which the signature is attached by the signature generation attachment unit, and the content provider terminal device comprises: a no-signature program generation unit operable to generate the program that is necessary for playing back the digital content and to which no signature is attached; a no-signature program storage unit operable to store therein the no-signature program generated by the no-signature program generation unit; a transmission unit operable to transmit the no-signature program stored in the no-signature program storage unit; a reception unit operable to receive a signature program that is the no-signature program transmitted by the transmission unit to which the signature is attached; a signature program storage unit operable to store therein the signature program received by the reception unit; and a recording unit operable to record, in a signature program storage region of the recording medium, the signature program stored in the signature program storage unit, and the playback device comprises: a reading unit operable to receive the digital content, the program necessary for playing back the digital content, and a medium type of the recording medium in which the digital content and the program are recorded; a signature type judgment unit operable to judge a signature type of the signature attached to the program; a medium type judgment unit operable to judge the medium type of the recording medium; the signature type judgment unit; and a playback permission determination unit operable to determine whether to play back the digital content, based on results of the judgments made by the signature type judgment unit and the medium type judgment unit.

The present invention provides the copyright protection data processing system, wherein the playback device further comprises a signature verification unit operable to verify the signature attached to the program, and the certification authority terminal device further comprises a signature type writing unit operable to write the signature type received by the reception unit into the header part of the no-signature program received by the reception unit, and if the signature is not authentic as a result of the verification performed by the signature verification unit, the playback device does not play back the digital content.

The present invention provides the copyright protection data processing system, wherein the signature generation attachment unit switches the signature generation based on the signature type received by the reception unit, and the signature verification unit switches the signature verification based on the signature type judged by the signature type judgment unit.

The present invention provides the copyright protection data processing system, wherein if the signature type judged by the signature type judgment unit is the official release type, the signature verification unit performs hash operation for the entire header part and instruction code part of the program, verifies the signature using a value obtained as a result of the hash operation and signature data described in the signature data part of the program, and if the signature type judged by the signature type judgment unit is the test release type, the signature verification unit performs hash operation for the entire header part and data part of the program, performs bit-inversion on a value obtained as a result of the hash operation to obtain a correction value, verifies the signature using the correction value and the signature data described in the signature data part of the program, and if the signature type judged by the signature type judgment unit is the official release type, the signature generation attachment unit performs hash operation for the entire header part and instruction code part of the no-signature program, and generates a signature for a value obtained as a result of the hash operation.

The present invention provides a playback method of playing back a digital content, the playback method comprising: a reading step of receiving the digital content, a program necessary for playing back the digital content, and a medium type of a recording medium in which the digital content and the program are recorded; a signature type judgment step of judging a signature type of a signature attached to the program; a medium type judgment step of judging the medium type of the recording medium; and a playback permission determination step of determining whether to permit playback of the digital content based on results of the judgments made by the signature type judgment step and the medium type judgment step.

The present invention provides a content provision method of recording a digital content, the content provision method comprising: a no-signature program generation step of generating a no-signature program that is necessary for playing back the digital content and to which no signature is attached; a no-signature program storage step of storing the no-signature program generated in the no-signature program generation step; a transmission step of transmitting the no-signature program stored in the no-signature program storage step; a reception step of receiving a signature program that is the no-signature program transmitted in the transmission step to which a signature is attached; a signature program storage step of storing the signature program received in the reception step; and a recording step of recording, in a signature program storage region of a recording medium, the signature program stored in the signature program storage step.

The present invention provides a certification method of attaching a signature to a received no-signature program to which no signature is attached, the certification method comprising: a certification authority public key/secret key generation step of generating a pair of a certification authority public key and a certification authority secret key to be used for generating a signature for the no-signature program and verifying the signature; a certification authority public key/secret key storage step of storing the pair of the certification authority public key and the certification authority secret key generated in the certification authority public key/secret key generation step; a reception step of receiving the no-signature program based on the content provision method; a signature generation attachment step of attaching a signature to the no-signature program received in the reception step; and a transmission step of transmitting the signature program to which the signature is attached in the signature attachment step.

The present invention provides a program for use in a playback device for playing back a digital content, wherein the program comprising: a reading step of receiving the digital content, a program necessary for playing back the digital content, and a medium type of a recording medium in which the digital content and the program are recorded; a signature type judgment step of judging a signature type of a signature attached to the program; a medium type judgment step of judging the medium type of the recording medium; and a playback permission determination step of determining whether to permit playback of the digital content based on results of the judgments made by the signature type judgment step and the medium type judgment step.

The present invention provides the program that is recorded in a computer-readable program recording medium.

The present invention provides an integrated circuit that relates to a playback device for playing back a digital content, the integrated circuit comprising: a reading unit operable to receive the digital content, a program necessary for playing back the digital content, and a medium type of a recording medium in which the digital content and the program are recorded; a signature type judgment unit operable to judge a signature type of a signature attached to the program; a medium type judgment unit operable to judge the medium type of the recording medium; and a playback permission determination unit operable to determine whether to permit playback of the digital content based on results of the judgments made by the signature type judgment unit and the medium type judgment unit.

(12) The present invention may be any combination of the above embodiments and modifications.

The present invention can be managerially, continuously, and repeatedly used in an industry that sells contents and in an industry that manufactures and sells devices that use the contents.

The invention claimed is:

1. A content playback device for playing back a digital content, the content playback device comprising:
at least one processor configured to operate as:
an information acquisition unit operable to acquire a content playback program that is a computer program for playing back the digital content on a recording medium in which the digital content, the content playback program, and a digital signature generated for the content playback program are recorded;
a medium type judgment unit operable to judge whether a type of the recording medium is a read-only type or a recordable type;
a signature verification unit operable to perform verification of the digital signature using different signature verification methods depending on whether the type of the recording medium is judged to be the read-only type or the recordable type; and
a playback permission determination unit operable to stop a processing relating to playback of the digital content by execution of the content playback program if the verification is unsuccessful.

2. The content playback device of claim 1, wherein
the content playback program includes a header part and an instruction code part,
the signature verification unit performs, as a preprocessing of the verification of the digital signature, a hash operation on at least one portion of the header part and all portions of the instruction code part, and performs the verification of the digital signature using a value obtained as a result of the hash operation, regardless of whether the type of recording medium is judged to be the read-only type or the recordable type.

3. The content playback device of claim 2, wherein
the signature verification unit uses all the portions of the header part.

4. The content playback device of claim 2, wherein
the header part includes an instruction code size field defining a size of the instruction code part, and
the signature verification unit overwrites the instruction code size field with a fixed value before performing the hash operation if the type of recording medium is judged to be the recordable type.

5. The content playback device of claim 2, wherein
the signature verification unit performs the hash operation on the at least one portion of the header part and all the portions of the instruction code part, performs bit-inversion on the value obtained as a result of the hash operation, and performs the verification of the digital signature using a value obtained as a result of the bit-inversion, if the judged type of the recording medium is the recordable type.

6. The content playback device of claim 1, further comprising:
an encryption judgment unit operable to judge whether the digital content is encrypted, wherein the playback permission determination unit stops the processing relating to playback of the digital content by execution of the content playback program if the digital content is judged to be encrypted.

7. A content playback method with use of a content playback device including an information acquisition unit, a medium type judgment unit, a signature verification unit, and a playback permission determination unit, the content playback method comprising:
an information acquisition step, using the information acquisition unit, of acquiring a digital content on a recording medium in which the digital content, a content playback program that is a computer program for playing back the digital content, and a digital signature generated for the content playback program are recorded;
a medium type judgment step, using the medium type judgment unit, of judging whether a type of the recording medium is a read-only type or a recordable type;
a signature verification step, using the signature verification unit, of performing verification of the digital signature using different signature verification methods depending on whether the type of the recording medium is judged to be the read-only type or the recordable type; and
a playback permission determination step, using the playback permission determination unit, of stopping a processing relating to playback of the digital content by execution of the content playback program if the verification is unsuccessful.

8. A non-transitory computer-readable recording medium storing a content playback control computer program, the content playback control computer program causing a computer to perform steps comprising:
an information acquisition step of acquiring a digital content on a recording medium in which the digital content, a content playback program that is a computer program for playing back the digital content, and a digital signature generated for the content playback program are recorded;

a medium type judgment step of judging whether a type of the recording medium is a read-only type or a recordable type;

a signature verification step of performing verification of the digital signature using different signature verification methods depending on whether the type of the recording medium is judged to be the read-only type or the recordable type; and a playback permission determination step of stopping a processing relating to playback of the digital content by execution of the content playback program if the verification is unsuccessful.

9. An integrated circuit that relates to a content playback device, the integrated circuit comprising:

at least one processor configured to operate as:

an information acquisition unit operable to acquire a content playback program that is a computer program for playing back the digital content on a recording medium in which the digital content, the content playback program, and a digital signature generated for the content playback program are recorded;

a medium type judgment unit operable to judge whether a type of the recording medium is a read-only type or a recordable type;

a signature verification unit operable to perform verification of the digital signature using different signature verification methods depending on whether the type of the recording medium is judged to be the read-only type or the recordable type; and a playback permission determination unit operable to stop a processing relating to playback of the digital content by execution of the content playback program if the verification is unsuccessful.

10. A copyright protection data processing system including a certification authority terminal device for attaching a digital signature to a content playback program that is a computer program for playing back a digital content, a content provider terminal device for recording the digital content and the content playback program in a recording medium, and a content playback device for playing back the digital content, wherein the certification authority terminal device comprises:

a first reception unit operable to receive the content playback program and signature type information from the content provider terminal device, the signature type information indicating whether a signature type of a digital signature to be attached to the content playback program is a test release type or an official release type;

a signature type recording unit operable to add the received signature type information to the content playback program;

a signature generation attachment unit operable to generate a digital signature using different signature generation methods depending on whether the signature type information indicates the test release type or the official release type, and attach the generated digital signature to the content playback program to generate a signature program having the digital signature attached thereto; and a first transmission unit operable to transmit the generated signature program to the content provider terminal device, the content provider terminal device comprises:

a no-signature program storage unit operable to store therein the content playback program;

an acquisition unit operable to acquire the signature type information indicating the signature type of the digital signature to be attached to the content playback program;

a second transmission unit operable to transmit the content playback program and the signature type information to the certification authority terminal device;

a second reception unit operable to receive the signature program from the certification authority terminal device; and a recording unit operable to record the signature program and the digital content in the recording medium, and the content playback device comprises:

at least one processor configured to operate as:

an information acquisition unit operable to acquire the signature program on the recording medium;

a medium type judgment unit operable to judge whether a type of the recording medium is a read-only type or a recordable type;

a signature verification unit operable to perform verification of the digital signature using different signature verification methods depending on whether the type of the recording medium is judged to be the read-only type or the recordable type; and a playback permission determination unit operable to stop a processing relating to playback of the digital content by execution of the content playback program if the verification is unsuccessful.

11. A non-transitory computer-readable recording medium having recorded therein a content playback control computer program, the content playback control computer program causing a computer to perform steps comprising:

an information acquisition step of acquiring a content playback program on a recording medium in which a digital content, the content playback program, and a digital signature generated for the content playback program are recorded, the content playback program being a computer program for playing back the digital content;

a medium type judgment step of judging whether a type of the recording medium is a read-only type or a recordable type;

a signature verification step of performing verification of the digital signature using different signature verification methods depending on whether the type of the recording medium is judged to be the read-only type or the recordable type; and a playback permission determination step of stopping a processing relating to playback of the digital content by execution of the content playback program if the verification is unsuccessful.

* * * * *